(12) United States Patent
Sewak et al.

(10) Patent No.: US 11,538,083 B2
(45) Date of Patent: Dec. 27, 2022

(54) COGNITIVE FASHION PRODUCT RECOMMENDATION SYSTEM, COMPUTER PROGRAM PRODUCT, AND METHOD

(71) Applicant: International Business Machines Corporation, Armonk, NY (US)

(72) Inventors: Mohit Sewak, Lucknow (IN); Iman Choudhury, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 15/982,202

(22) Filed: May 17, 2018

(65) Prior Publication Data

US 2019/0355041 A1 Nov. 21, 2019

(51) Int. Cl.
    *G06Q 30/00* (2012.01)
    *G06Q 30/06* (2012.01)

(52) U.S. Cl.
    CPC ..... *G06Q 30/0627* (2013.01); *G06Q 30/0631* (2013.01); *G06Q 30/0643* (2013.01)

(58) Field of Classification Search
    CPC .......... G06Q 30/0627; G06Q 30/0631; G06Q 30/0643
    USPC ..................................................... 705/26.61
    See application file for complete search history.

(56) References Cited

U.S. PATENT DOCUMENTS

| | | |
|---|---|---|
| 5,749,081 A | 5/1998 | Whiteis |
| 6,266,649 B1 | 7/2001 | Linden et al. |
| 7,007,074 B2 | 2/2006 | Radwin |
| 7,113,917 B2 | 9/2006 | Jacobi et al. |
| 7,617,016 B2 | 11/2009 | Wannier et al. |
| 7,921,061 B2 | 4/2011 | Rangarajan et al. |
| 7,979,877 B2 | 7/2011 | Huber et al. |
| 8,620,707 B1 | 12/2013 | Belyi et al. |
| 8,751,930 B2 | 6/2014 | Jhoney et al. |
| 8,908,962 B2 | 12/2014 | Bhardwaj et al. |
| 9,135,491 B2 | 9/2015 | Morandi et al. |
| 9,141,886 B2 | 9/2015 | Auclair et al. |

(Continued)

FOREIGN PATENT DOCUMENTS

| | | |
|---|---|---|
| CN | 104281890 A | 1/2015 |
| CN | 106504064 A | 3/2017 |

(Continued)

OTHER PUBLICATIONS

Han, X. (2018). Deep learning for fashion and forensics (Order No. 10842589). Available from ProQuest Dissertations & Theses Global. (2118074055). Retrieved from https://www.proquest.com/dissertations-theses/deep-learning-fashion-forensics/docview/2118074055/se-2?accountid=14753 (Year: 2018).*

(Continued)

*Primary Examiner* — Marissa Thein
*Assistant Examiner* — Arielle E Weiner
(74) *Attorney, Agent, or Firm* — Elliot J. Shine

(57) ABSTRACT

A method, computer program product, and computing system for associating one or more fashion products on a website with a user accessing the website. One or more recommendations may be provided to the user for fashion products based upon, at least in part, one or more fashion-ability scores representative of the one or more fashion products associated with the user on the website and one or more fashion-ability scores representative of the one or more fashion products on the website.

20 Claims, 9 Drawing Sheets

(56) References Cited

U.S. PATENT DOCUMENTS

| | | | |
|---|---|---|---|
| 9,661,886 B1 | 5/2017 | Selvarajan | |
| 9,785,898 B2 | 10/2017 | Hofman et al. | |
| 10,043,109 B1* | 8/2018 | Du | G06N 3/0454 |
| 10,062,039 B1 | 8/2018 | Lockett | |
| 10,540,575 B1 | 1/2020 | Brody | |
| 10,614,342 B1* | 4/2020 | Lorbert | G06K 9/00362 |
| 10,685,057 B1* | 6/2020 | Chavez | G06N 3/08 |
| 10,691,740 B1* | 6/2020 | Anorga | G06F 16/54 |
| 10,755,228 B1 | 8/2020 | Hasan | |
| 10,776,417 B1* | 9/2020 | Ravichandran | G06F 16/5838 |
| 2006/0277098 A1 | 12/2006 | Chung | |
| 2007/0150801 A1 | 6/2007 | Chidlovskii et al. | |
| 2007/0244842 A1 | 10/2007 | Ishii et al. | |
| 2008/0228749 A1 | 9/2008 | Brown | |
| 2008/0262917 A1 | 10/2008 | Green | |
| 2008/0306819 A1 | 12/2008 | Berkhin | |
| 2008/0307052 A1 | 12/2008 | Krishnan et al. | |
| 2009/0006156 A1 | 1/2009 | Hunt et al. | |
| 2009/0276291 A1 | 11/2009 | Wannier et al. | |
| 2011/0011936 A1 | 1/2011 | Morandi et al. | |
| 2011/0103682 A1 | 5/2011 | Chidlovskii et al. | |
| 2012/0123978 A1 | 5/2012 | Toderice et al. | |
| 2012/0173324 A1* | 7/2012 | Vallery | G06Q 30/0224 705/26.7 |
| 2012/0323620 A1 | 12/2012 | Hofman et al. | |
| 2013/0066742 A1 | 3/2013 | Stevens et al. | |
| 2014/0003729 A1 | 1/2014 | Auclair | |
| 2014/0039979 A1 | 2/2014 | Zhang et al. | |
| 2014/0379426 A1 | 12/2014 | Guo et al. | |
| 2015/0046223 A1 | 2/2015 | Sewak | |
| 2015/0058079 A1 | 2/2015 | Freund et al. | |
| 2015/0139485 A1 | 5/2015 | Bourdev | |
| 2015/0254675 A1* | 9/2015 | Kannan | G06Q 30/02 705/304 |
| 2015/0324828 A1* | 11/2015 | Ouimet | G06Q 30/0222 705/14.23 |
| 2015/0332296 A1 | 11/2015 | Chu et al. | |
| 2015/0339726 A1* | 11/2015 | Herring | G06Q 30/0261 705/14.58 |
| 2015/0347933 A1 | 12/2015 | Sewak | |
| 2016/0085889 A1 | 3/2016 | Sewak | |
| 2016/0110794 A1 | 4/2016 | Hsiao et al. | |
| 2016/0125503 A1 | 5/2016 | Li et al. | |
| 2016/0132697 A1 | 5/2016 | Simske | |
| 2016/0148150 A1 | 5/2016 | Curtat et al. | |
| 2016/0189011 A1 | 6/2016 | Bhardwaj et al. | |
| 2016/0189274 A1 | 6/2016 | MacLaurin et al. | |
| 2016/0225053 A1 | 8/2016 | Romley et al. | |
| 2016/0371261 A1 | 12/2016 | Cormack et al. | |
| 2017/0004567 A1 | 1/2017 | Dutt | |
| 2017/0098187 A1 | 4/2017 | Jung et al. | |
| 2017/0178061 A1 | 6/2017 | Griffin et al. | |
| 2018/0005035 A1 | 1/2018 | Bogolea et al. | |
| 2018/0005106 A1 | 1/2018 | Hachiya | |
| 2018/0114114 A1 | 4/2018 | Molchanov et al. | |
| 2018/0189725 A1 | 7/2018 | Mattingly et al. | |
| 2018/0218436 A1* | 8/2018 | Cooper | G06Q 30/0631 |
| 2018/0349477 A1 | 12/2018 | Jaech | |
| 2018/0357258 A1* | 12/2018 | Bu | G06K 9/623 |
| 2019/0026609 A1* | 1/2019 | Shen | G06N 3/08 |
| 2019/0043003 A1 | 2/2019 | Fisher et al. | |
| 2019/0130285 A1* | 5/2019 | Snyder | G06N 3/04 |
| 2019/0164210 A1* | 5/2019 | Kornilov | G06T 17/20 |
| 2019/0220694 A1 | 7/2019 | Biswas et al. | |
| 2019/0251446 A1 | 8/2019 | Fang et al. | |
| 2019/0278426 A1 | 9/2019 | He et al. | |
| 2019/0318209 A1 | 10/2019 | Sewak et al. | |
| 2019/0318210 A1 | 10/2019 | Sewak et al. | |
| 2019/0318299 A1 | 10/2019 | Sewak | |
| 2019/0318304 A1 | 10/2019 | Sewak | |
| 2019/0355008 A1 | 11/2019 | Sewak | |
| 2019/0370874 A1 | 12/2019 | Brooks | |
| 2020/0005087 A1 | 1/2020 | Sewak | |
| 2020/0034781 A1 | 1/2020 | Sewak et al. | |

FOREIGN PATENT DOCUMENTS

| | | |
|---|---|---|
| CN | 110363213 A | 10/2019 |
| CN | 107437092 A | 11/2019 |
| CN | 110728015 A | 1/2020 |
| CN | 110782267 A | 2/2020 |
| CN | 107330451 A | 6/2020 |
| JP | 2004508604 A | 3/2004 |
| WO | 2010141637 A1 | 12/2010 |
| WO | 2015127394 A1 | 8/2015 |
| WO | 2016098973 A1 | 6/2016 |
| WO | 2017203262 A2 | 11/2017 |

OTHER PUBLICATIONS

Jannach, D., Ludewig, M., & Lerche, L. (2017). Session-based item recommendation in e-commerce: On short-term intents, reminders, trends and discounts. User Modeling and User-Adapted Interaction, 27(3-5), 351-392. doi:http://dx.doi.org/10.1007/s11257-017-9194-1 (Year: 2017).*

Sewak et al., "Practical Convolutional Neural Networks," Implement Advanced Deep Learning Models Using Python, Chapter 2, Feb. 2018, pp. 26-40.

Sewak et al., "Practical Convolutional Neural Networks," Implement Advanced Deep Learning Models Using Python, Chapter 4, Feb. 2018, pp. 92-102.

Sewak et al., "Practical Convolutional Neural Networks," Implement Advanced Deep Learning Models Using Python, Chapter 5, Feb. 2018, pp. 104-113.

Phillips et al., "Narrative and Persuasion in Fashion Advertising," Journal of Consumer Research/Oxford, vol. 37, Issue 3, Oct. 1, 2010, pp. 1-6, Abstract provided.

Davis et al., "Apparel Advertising Appeals as a Function of Apparel Classification: Trendy Versus Classic," Perceptual and Motor Skills, 1989, 68, pp. 1011-1014.

Lennon et al., "Evaluations of Apparel Advertising as a Function of Self-Monitoring," Preceptual and Motor Skills, 1988, 66, pp. 987-996.

Ingram, "Ideas for Advertising Clothes," Chron.com, http://smallbusiness.chron.com/ideas-advertising-clothes-10375.html, downloaded May 1, 2018, pp. 1-5.

LeChat, "Promotional Strategies fora Clothing Store," Chron.com, http://smallbusiness.chron.com/promotional-strategies-clothing-store-13851.html, downloaded May 1, 2018, pp. 1-4.

West, "Fashion Marketing Techniques," Chron.com, http:/smallbusiness.chron.com/fashion-marketing-techniques-65320.html, downloaded May 1, 2018, pp. 1-4.

Reynolds, "Creative Marketing Strategies for the Fashion Industry," Chron.com, http:/smallbusiness.chron.com/creative-marketing-strategies-fashion-industry-67393.html, downloaded May 1, 2018, pp. 1-5.

Masaki, "How to Advertise and market Your Clothing Line," Clothing Line—Advertising and Marketing Tips and Tricks by HTSACC, https://www.howtostartacloghingcompany.com/advertise-market-clothing-line/downloaded May 1, 2018, pp. 1-13.

Author Unknown, "20 Product Priorization Techniques: A Map and Guided Tour," folding Burritos (https://foldingburritos.com/product-prioritization-techniques/downloaded May 1, 2018, pp. 1-30.

IBM "IBM Patent Applications to be Treated as Related," filed May 17, 2018, pp. 1-2.

IBM, U.S. Appl. No. 15/982,254, Patent Application to be treated as Related, for Examiner's Eyes Only, pp. 1-48, May 17, 2018.

He et al., "Fashion Net: Personalized Outfit Recommendation with Deep Neural Network", arXiv:1810.02443v1, Oct. 4, 2018, 9 pages.

Huang et al., "Outfit Recommendation System Based on Deep Learning", Advances in Computer Science Research, vol. 74, 2nd International Conference on Computer Engineering, Information Science & Technology (ICCIA 2017), pp. 170-174.

Jaradat, "Deep Cross-Domain Fashion Recommendation", Proceedings of the Eleventh ACM Conference on Recommender Systems, Aug. 27-31, 2017, pp. 407-410.

(56) References Cited

OTHER PUBLICATIONS

Li et al., "Mining Fashion Outfit Composition Using an End-to-End Deep Learning Approach on Set Data", IEEE Transactions on Multimedia 19.8 (2017), pp. 1946-1955.
Liu et al., "Deepfashion: Powering Robust Clothes Recognition and Retrieval with Rich Annotations", Proceedings of the IEEE Conference on Computer Vision and Pattern Recognition, 2016, pp. 1096-1104.
Nguyen et al., "Learning to Rank for Personalised Fashion Recommender Systems via Implicit Feedback", Mining Intelligence and Knowledge Exploration, Springer, 2014, pp. 51-61.
Shah et al., "Fashion Outfit Composition by Deep Learning Approach", International Research Journal of Engineering and Technology (IRJEI), vol. 05 Issue: 06, Jun. 2018, pp. 1549-1555.
Conlon, "The Vogue Glossary", http://www.vogue.co.uk/gallery/the-vogue-glossary, Oct. 17, 2013, 63 pages.
Alves, "Predicting Product Sales in Fashion Retailing: A Data Analytics Approach", Jul. 23, 2017, 59 pages.
Spolini, "Cognitive Computing supports fashion designer", http://www.vogue.it/en/vogue-talents/news/2017/03/29/watson-ibm-jason-grech-marchesa-the-north-face/, Mar. 29, 2017, 4 pages.
McClellan, "Cognitive Marchesa dress lights up the night", https://www.ibm.com/blogs/internet-of-things/cognitive-marchesa-dress/, Oct. 27, 2016, 3 pages.
Rubin, "Weaving Cognitive into Couture: Watson and Marchesa Collaborate for the Met Gala", https://www.ibm.com/blogs/think/2016/04/watson-and-marchesa/, Apr. 29, 2016, 4 pages.
Mastroianni, "Marchesa, IBM Watson design "cognitive dress" for Met Gala", http://www.cbsnews.com/news/marchesa-ibm-watson-to-debut-cognitive-dress-at-mondays-met-gala/, May 2, 2016, 4 pages.
Fashion Dictionary, http://wwd.com/fashion-dictionary/, Accessed Jun. 25, 2018, 22 pages.
Witcher et al., "The Forester Wave™: Omnichannel Order Management, Q3 2016", The Nine OMS Providers That Matter Most for Omnichannel Retail and How They Stack Up, for Ebusiness & Channel Strategy Professionals., Forrester.com, Jul. 12, 2016, 20 pages.
Walker, "Inventory Management With Machine Learning—3 Use Cases in Industry", Techemergence, https://www.techemergence.com, Feb. 20, 2018, 10 pages.
Knight, "Inside Amazon's Warehouse, Human-Robot Symbiosis," Intelligent Machines, Jul. 7, 2015, pp. 1-8.
Canitz, "Machine Learning in Supply Chain Planning," Logility Planning Optimized, Oct. 4, 2016, pp. 1-2.
Author Unknown, "Coca-Cola Leverages AI for Inventory Management," Technology News, Supply Chain 24/7 Article, Mar. 28, 2017, pp. 1-11.
Pending U.S. Appl. No. 16/132,867, filed Sep. 17, 2018, entitled: "System and Method for Cognitive and Preemptive Fashion Inventory Management & Order Fulfilment", 53 pages.
Ralph et al., "A Framework for Automatic Online Personalization", Proceedings of the 39th Hawaii International Conference on System Sciences—2006, Downloaded on Nov. 6, 2020, 10 pages.
Tuinhof et al., "Image Based Fashion Product Recommendation with Deep Learning", International Conference on Machine Learning, Optimization, and Data Science, Jul. 17, 2018, pp. 1-10.
National Intellectual Property Administration, PRC, "Notification of the First Office Action", Application No. or patent No. 201910286744.7, Issue No. 2022083100600750, Priority date/Filing date: Apr. 11, 2018, dated Sep. 5, 2022, pp. 1-5.
Rong, "Classification of Clothing Type Based on Convolutional Neural Network", College of Computer Science, Sichuan University, Chengdu 610000, Mar. 2016, pp. 1-4.

\* cited by examiner

10 associating one or more fashion products on a website with a user accessing the website
200

↓ providing one or more recommendations to the user for fashion products based upon, at least in part, one or more fashion-ability scores representative of the one or more fashion products associated with the user on the website and one or more fashion-ability scores representative of the one or more fashion products on the website
202

↓ determining that the user is accessing the website in response to a user selection of a digital advertisement displayed on a different website
214

↓ determining one or more fashion products shown in the digital advertisement displayed on the different website
216

↓ providing one or recommendations for one or more fashion products based upon, at least in part, one or more fashion-ability scores representative of the one or more fashion products shown in the digital advertisement displayed on the different website and the one or more fashion-ability scores representative of the one or more fashion products on the website
218 providing one or more recommendations for one or more newly added fashion products based upon, at least in part, one or more fashion-ability scores representative of the one or more fashion products associated with the user on the website and one or more fashion-ability scores representative of the one or more newly added fashion products
204 providing one or more recommendations for one or more fashion products on the website with a fashion-ability score within a threshold of the fashion-ability score of the one or more fashion products associated with the user
206

↓ providing one or more recommendations for one or more fashion products on the website from a different category than a category of the one or more fashion products associated with the user
208 providing one or more recommendations for one or more fashion products on the website with a fashion-ability score greater than the fashion-ability score of the one or more fashion products associated with the user
210 providing one or more recommendations for one or more fashion products on the website from the same category as the fashion products associated with the user that have fashion-ability scores within a threshold of the fashion-ability score of the one or more fashion products associated with the user and that have a price greater than a price of the one or more fashion products associated with the user
212

FIG. 2

COGNITIVE FASHION PRODUCT RECOMMENDATION SYSTEM, COMPUTER PROGRAM PRODUCT, AND METHOD

BACKGROUND eCommerce sales may be driven by recommendations provided to a customer. Such recommendations may be obtained using the similarity between an existing user and another user and the items that the existing user has purchased to the other items similar to these. Supervised learning systems (e.g., various combinations of classification systems and algorithms) have been tried directly and in combination with other unsupervised/semi-supervised learning algorithms in this domain, but their effectiveness has remained limited and questionable owing to the scarcity of labeled data available in such platforms (e.g., ratio of movies available on a video streaming service versus what a single person could have rated/viewed, or ratio of number of stock keeping units (SKUs) on a fashion website to what a consumer has purchased).

Traditional recommendation systems have utilized collaborative filtering, memory based models, and/or user/item similarity using a user's purchase history. But in the area of cognitive and visual analytics, embodiments of the present disclosure are focused on finding the reason why a particular person likes a particular product (e.g., in eCommerce the product image in a product catalogue may represent the actual interface between the customer and the product) and what he or she will be looking for in his or her next purchase.

BRIEF SUMMARY OF DISCLOSURE

In one example implementation, a computer-implemented method is executed on a computing device and may include but is not limited to associating, at the computing device, one or more fashion products on a website with a user accessing the website. One or more recommendations may be provided to the user for fashion products based upon, at least in part, one or more fashion-ability scores representative of the one or more fashion products associated with the user on the website and one or more fashion-ability scores representative of the one or more fashion products on the website.

One or more of the following example features may be included. Providing the one or more recommendations to the user for fashion products may include providing one or more recommendations for one or more newly added fashion products based upon, at least in part, one or more fashion-ability scores representative of the one or more fashion products associated with the user on the website and one or more fashion-ability scores representative of the one or more newly added fashion products. Providing the one or more recommendations to the user for fashion products may include providing one or more recommendations for one or more fashion products on the website from a different category than a category of the one or more fashion products associated with the user. Providing the one or more recommendations to the user for fashion products may include providing one or more recommendations for one or more fashion products on the website with a fashion-ability score within a threshold of the fashion-ability score of the one or more fashion products associated with the user. Providing the one or more recommendations to the user for fashion products may include providing one or more recommendations for one or more fashion products on the website with a fashion-ability score greater than the fashion-ability score of the one or more fashion products associated with the user. Providing the one or more recommendations to the user for fashion products may include providing one or more recommendations for one or more fashion products on the website from the same category as the fashion products associated with the user that have fashion-ability scores within a threshold of the fashion-ability score of the one or more fashion products associated with the user and that have a price greater than a price of the one or more fashion products associated with the user. The computer-implemented method may also include determining that the user is accessing the website in response to a user selection of a digital advertisement displayed on a different website, determining one or more fashion products shown in the digital advertisement displayed on the different website, and providing one or more recommendations for one or more fashion products based upon, at least in part, one or more fashion-ability scores representative of the one or more fashion products shown in the digital advertisement displayed on the different website and the one or more fashion-ability scores representative of the one or more fashion products on the web site.

In another example implementation, a computer program product resides on a non-transitory computer readable medium that has a plurality of instructions stored on it. When executed across one or more processors, the plurality of instructions cause at least a portion of the one or more processors to perform operations that may include but are not limited to associating one or more fashion products on a website with a user accessing the website. One or more recommendations may be provided to the user for fashion products based upon, at least in part, one or more fashion-ability scores representative of the one or more fashion products associated with the user on the website and one or more fashion-ability scores representative of the one or more fashion products on the website.

One or more of the following example features may be included. Providing the one or more recommendations to the user for fashion products may include providing one or more recommendations for one or more newly added fashion products based upon, at least in part, one or more fashion-ability scores representative of the one or more fashion products associated with the user on the website and one or more fashion-ability scores representative of the one or more newly added fashion products. Providing the one or more recommendations to the user for fashion products may include providing one or more recommendations for one or more fashion products on the website from a different category than a category of the one or more fashion products associated with the user. Providing the one or more recommendations to the user for fashion products may include providing one or more recommendations for one or more fashion products on the website with a fashion-ability score within a threshold of the fashion-ability score of the one or more fashion products associated with the user. Providing the one or more recommendations to the user for fashion products may include providing one or more recommendations for one or more fashion products on the website with a fashion-ability score greater than the fashion-ability score of the one or more fashion products associated with the user. Providing the one or more recommendations to the user for fashion products may include providing one or more recommendations for one or more fashion products on the website from the same category as the fashion products associated with the user that have fashion-ability scores within a threshold of the fashion-ability score of the one or more fashion products associated with the user and that have a price greater than a price of the one or more fashion products associated with the user. Operations of at least a portion of the one or more processors may include determining that the user is accessing the website in response to a user selection of a digital advertisement displayed on a different website, determining one or more fashion products shown in the digital advertisement displayed on the different web site, and providing one or more recommendations for one or more fashion products based upon, at least in part, one or more fashion-ability scores representative of the one or more fashion products shown in the digital advertisement displayed on the different website and the one or more fashion-ability scores representative of the one or more fashion products on the web site.

In another example implementation, a computing system comprising one or more processors and one or more memories, wherein the computing system is configured to perform operations that may include but are not limited to associating one or more fashion products on a website with a user accessing the website. One or more recommendations may be provided to the user for fashion products based upon, at least in part, one or more fashion-ability scores representative of the one or more fashion products associated with the user on the website and one or more fashion-ability scores representative of the one or more fashion products on the website.

One or more of the following example features may be included. Providing the one or more recommendations to the user for fashion products may include providing one or more recommendations for one or more newly added fashion products based upon, at least in part, one or more fashion-ability scores representative of the one or more fashion products associated with the user on the website and one or more fashion-ability scores representative of the one or more newly added fashion products. Providing the one or more recommendations to the user for fashion products may include providing one or more recommendations for one or more fashion products on the website from a different category than a category of the one or more fashion products associated with the user. Providing the one or more recommendations to the user for fashion products may include providing one or more recommendations for one or more fashion products on the website with a fashion-ability score within a threshold of the fashion-ability score of the one or more fashion products associated with the user. Providing the one or more recommendations to the user for fashion products may include providing one or more recommendations for one or more fashion products on the website with a fashion-ability score greater than the fashion-ability score of the one or more fashion products associated with the user. Providing the one or more recommendations to the user for fashion products may include providing one or more recommendations for one or more fashion products on the website from the same category as the fashion products associated with the user that have fashion-ability scores within a threshold of the fashion-ability score of the one or more fashion products associated with the user and that have a price greater than a price of the one or more fashion products associated with the user. Operations of the computing system may include determining that the user is accessing the website in response to a user selection of a digital advertisement displayed on a different website, determining one or more fashion products shown in the digital advertisement displayed on the different website, and providing one or more recommendations for one or more fashion products based upon, at least in part, one or more fashion-ability scores representative of the one or more fashion products shown in the digital advertisement displayed on the different website and the one or more fashion-ability scores representative of the one or more fashion products on the web site.

The details of one or more example embodiments are set forth in the accompanying drawings and the description below. Other possible example features and/or possible example advantages will become apparent from the description, the drawings, and the claims. Some embodiments may not have those possible example features and/or possible example advantages, and such possible example features and/or possible example advantages may not necessarily be required of some embodiments.

BRIEF DESCRIPTION OF THE SEVERAL VIEWS OF THE DRAWINGS

FIG. 2 is an example flowchart of the cognitive fashion product recommendation process of FIG. 1 according to one or more example embodiments of the disclosure;

Like reference symbols in the various drawings indicate like elements.

DETAILED DESCRIPTION

Figure 1:
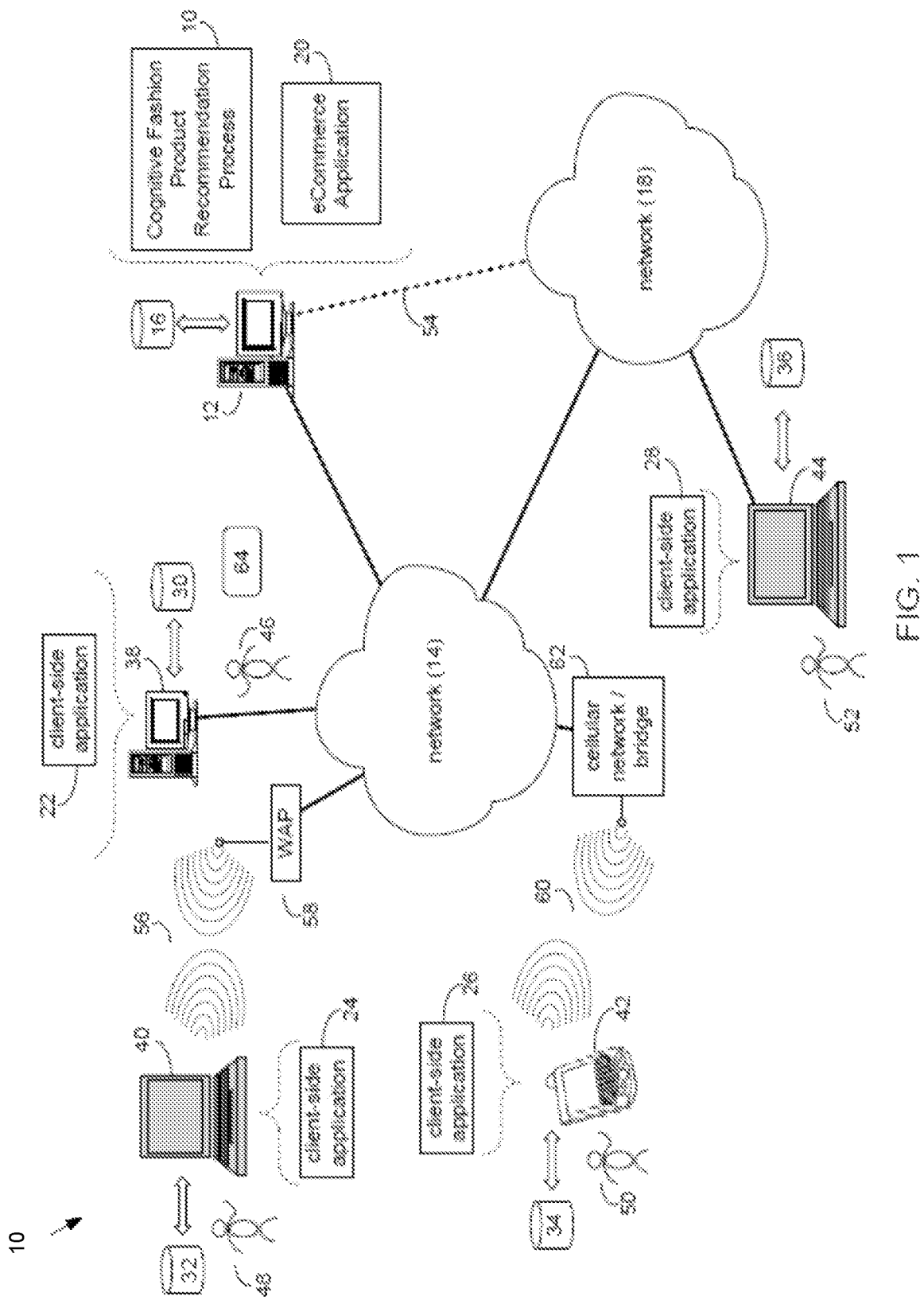
FIG. 1 is an example diagrammatic view of a cognitive fashion product recommendation process coupled to a distributed computing network according to one or more example embodiments of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible embodiments of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown cognitive fashion product recommendation process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a cognitive fashion product recommendation process, such as cognitive fashion product recommendation process 10 of FIG. 1, may associate one or more fashion products on a website with a user accessing the website. One or more recommendations may be provided to the user for fashion products based upon, at least in part, one or more fashion-ability scores representative of the one or more fashion products associated with the user on the website and one or more fashion-ability scores representative of the one or more fashion products on the website.

The instruction sets and subroutines of cognitive fashion product recommendation process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Cognitive fashion product recommendation process 10 may be a stand-alone application that interfaces with an applet/application that is accessed via client applications 22, 24, 26, 28. In some embodiments, cognitive fashion product recommendation process 10 may be, in whole or in part, distributed in a cloud computing topology. In this way, computing device 12 and storage device 16 may refer to multiple devices, which may also be distributed throughout network 14 and/or network 18.

Computing device 12 may execute an eCommerce application (e.g., eCommerce application 20), examples of which may include, but are not limited to, applications, portals, programs, and/or websites that facilitate the online purchases of one or more products (e.g., fashion products). Cognitive fashion product recommendation process 10 and/or eCommerce application 20 may be accessed via client applications 22, 24, 26, 28. Cognitive fashion product recommendation process 10 may be a stand-alone application, or may be an applet/application/script/extension that may interact with and/or be executed within eCommerce application 20, a component of eCommerce application 20, and/or one or more of client applications 22, 24, 26, 28. eCommerce application 20 may be a stand-alone application, or may be an applet/application/script/extension that may interact with and/or be executed within cognitive fashion product recommendation process 10, a component of cognitive fashion product recommendation process 10, and/or one or more of client applications 22, 24, 26, 28. One or more of client applications 22, 24, 26, 28 may be a stand-alone application, or may be an applet/application/script/extension that may interact with and/or be executed within and/or be a component of cognitive fashion product recommendation process 10 and/or eCommerce application 20. Examples of client applications 22, 24, 26, 28 may include, but are not limited to, applications that receive queries to search for content from one or more databases, servers, cloud storage servers, etc., a textual and/or a graphical user interface, a standard web browser, a customized web browser, a plugin, an Application Programming Interface (API), or a custom application. The instruction sets and subroutines of client applications 22, 24, 26, 28 which may be stored on storage devices 30, 32, 34, 36 coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28 may be configured to effectuate some or all of the functionality of cognitive fashion product recommendation process 10 (and vice versa). Accordingly, cognitive fashion product recommendation process 10 may be a purely server-side application, a purely client-side application, or a hybrid server-side/client-side application that is cooperatively executed by one or more of client applications 22, 24, 26, 28 and/or cognitive fashion product recommendation process 10.

One or more of client applications 22, 24, 26, 28 may be configured to effectuate some or all of the functionality of eCommerce application 20 (and vice versa). Accordingly, eCommerce application 20 may be a purely server-side application, a purely client-side application, or a hybrid server-side/client-side application that is cooperatively executed by one or more of client applications 22, 24, 26, 28 and/or eCommerce application 20. As one or more of client applications 22, 24, 26, 28 cognitive fashion product recommendation process 10, and eCommerce application 20, taken singly or in any combination, may effectuate some or all of the same functionality, any description of effectuating such functionality via one or more of client applications 22, 24, 26, 28 cognitive fashion product recommendation process 10, eCommerce application 20, or combination thereof, and any described interaction(s) between one or more of client applications 22, 24, 26, 28 cognitive fashion product recommendation process 10, eCommerce application 20, or combination thereof to effectuate such functionality, should be taken as an example only and not to limit the scope of the disclosure.

Users 46, 48, 50, 52 may access computing device 12 and cognitive fashion product recommendation process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Cognitive fashion product recommendation process 10 may include one or more user interfaces, such as browsers and textual or graphical user interfaces, through which users 46, 48, 50, 52 may access cognitive fashion product recommendation process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-7, cognitive fashion product recommendation process 10 may associate 200 one or more fashion products on a website with a user accessing the website. One or more recommendations may be provided 202 to the user for fashion products based upon, at least in part, one or more fashion-ability scores representative of the one or more fashion products associated with the user on the web site and one or more fashion-ability scores representative of the one or more fashion products on the website.

In some embodiments consistent with the present disclosure, systems and methods may be provided for providing one or more recommendations, on a website accessed by a user, for fashion products based upon, at least in part, one or more fashion-ability scores representative of one or more fashion products associated with the user on the website and one or more fashion-ability scores representative of the one or more fashion products available on the website. In this way, cognitive fashion product recommendation process 10 may recommend relevant fashion products to a user, based upon, at least in part, the "fashion taste" of the individual. For example, users may access online shopping applications or websites to search for and/or to purchase fashion products. Fashion products, in particular, may be time-variant because a user's fashion taste may change over time. For example, a user's interest in a particular fashion product may change in response to social trends, fashion trends, demographic changes, socio-economic changes, etc. When accessing a website with one or more fashion products, a user may view various fashion products and may select certain fashion products on the website to see various images and variations of the particular fashion product. Additionally, a user may select certain fashion products to place in a "shopping cart" or "wish list" for subsequent purchasing or viewing. Fashion products may include, but are not limited to, on or more of articles of clothing (e.g., shirts, pants, dresses, shorts, jackets, etc.), clothing accessories (e.g., shoes, socks, belts, hats, scarfs, etc.), jewelry (e.g., necklaces, earrings, bracelets, watches, pins, etc.), and the like.

As will be discussed in greater detail below and in some embodiments, cognitive fashion product recommendation process 10 may "model" a user's fashion taste to provide one or more recommendations for one or more fashion products based upon, at least in part, cognitive and visual analytics associated with the user's interaction with the website. For example, in eCommerce, the image of a fashion product on a website may represent the only interface between the user and the fashion product and may be used to determine what the user is looking for and what the user's fashion taste is. As will be discussed in greater detail below and in some embodiments, cognitive fashion product recommendation process 10 may provide recommendations for one or more fashion products based upon one or more fashion-ability scores representative of the one or more fashion products. In some embodiments and as will be discussed in greater detail below, a fashion-ability score may be a numerical representation of a fashion product defined for one or more attributes associated with the one or more fashion products. These fashion-ability scores may be generated by processing the image(s) of one or more fashion products using a neural network and by training the neural network with one or more attributes associated with the fashion product. By using fashion-ability scores to provide the one or more recommendations for fashion products, cognitive fashion product recommendation process 10 may provide recommendations that more accurately reflect a user's fashion taste using artificial intelligence systems and algorithms. For example, traditional recommendation systems are typically not able to use artificial intelligence systems to model a user's fashion taste to provide recommendations for fashion products based upon, at least in part, one or more fashion-ability scores representative of one or more fashion products. Rather, traditional recommendation systems typically use invasive surveys of limited numbers of users to determine what recommendations to provide.

Figure 3:
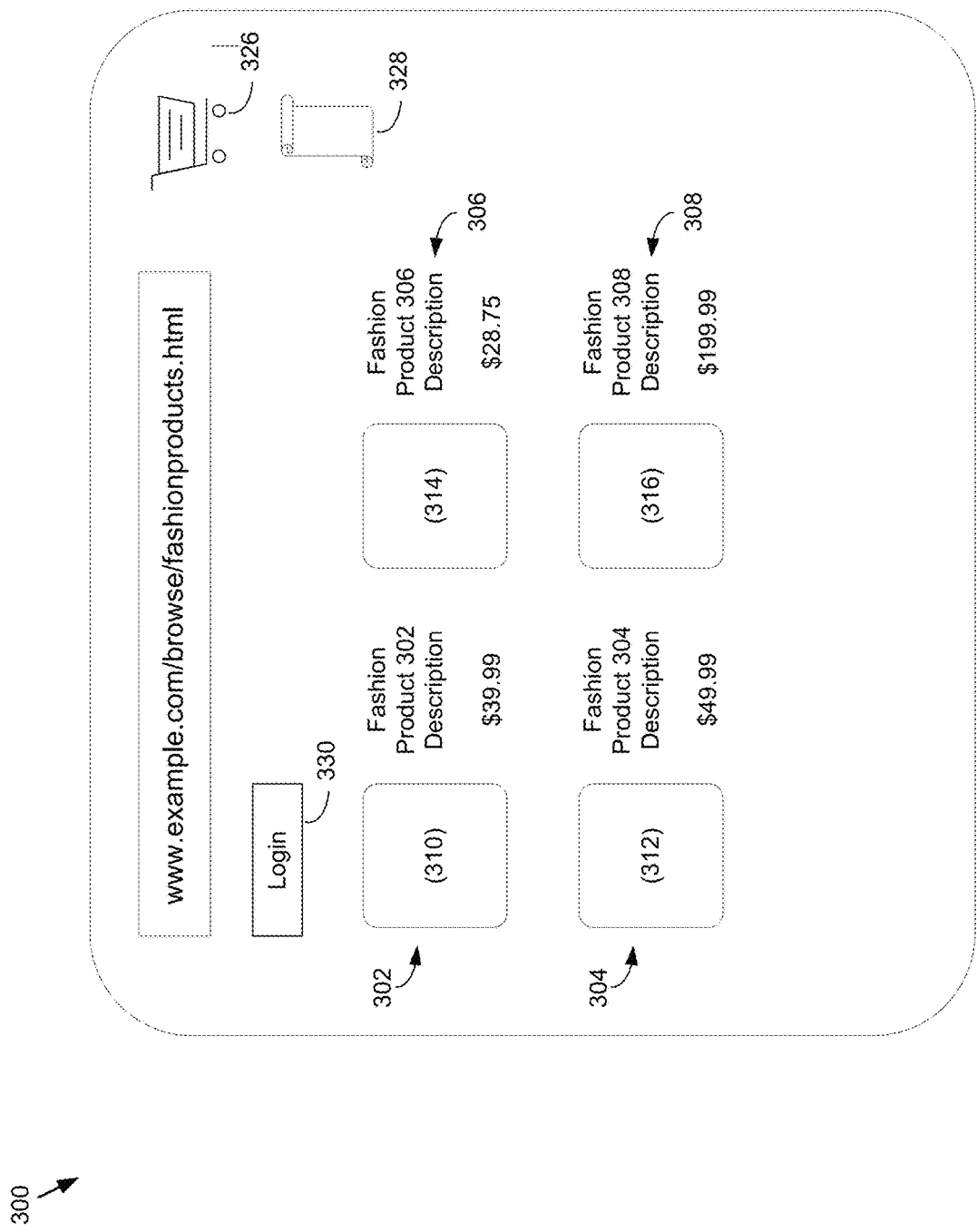
FIG. 3 is an example diagrammatic view of an eCommerce platform with one or more fashion products according to one or more example embodiments of the disclosure.

As generally discussed above with reference to FIG. 2, cognitive fashion product recommendation process 10 may associate 200 one or more fashion products on a website with a user accessing the website. Referring also to FIG. 3 and in some embodiments, a user may access a website (e.g., website 300). In some embodiments, the website (e.g., website 300) may be an eCommerce platform/portal configured to facilitate the online purchases of one or more fashion products. In some embodiments, the one or more fashion products may be available for viewing on the website and/or purchasing via the website. In some embodiments, the website (e.g., website 300) may include one or more fashion products (e.g., fashion products 302, 304, 306, 308). On the website (e.g., web site 300), the one or more fashion products (e.g., fashion products 302, 304, 306, 308) may be represented by images (e.g., fashion product images 310, 312, 314, 316) of the one or more fashion products rendered on a webpage of the website. While an example including four fashion products has been described, it will be appreciated that any number of fashion products are possible within the scope of the present disclosure.

In some embodiments, a webpage of the website (e.g., website 300) may include one or more images of the one or more fashion products (e.g., fashion product images 310, 312, 314, 316) and one or more descriptions associated with the one or more fashion products. In some embodiments, the website (e.g., website 300) may include user-selectable buttons (e.g., shopping cart button and wish list button) to add a fashion product to a "shopping cart" (e.g., shopping cart 326) and/or a "wish list" (wish list 328) on the website (e.g., website 300). In some embodiments, the shopping cart (e.g., shopping cart 326) may be a digital representation of a physical shopping cart that may be used to identify which fashion products the user would like to purchase. The shopping cart (e.g., shopping cart 326) may include a data structure configured to store the one or more fashion products (e.g., links to webpages and/or portions of the web site associated with the fashion product) selected by the user for purchase. In some embodiments, the wish list (e.g., wish list 328) may be a list used for identifying which fashion products the user would like to remember and/or potentially purchase. The wish list (e.g., wish list 328) may include a data structure configured to store the one or more fashion products (e.g., links to webpages and/or portions of the website associated with the fashion product) selected by the user for future consideration.

In some embodiments, the website (e.g., website 300) may include user-selectable links to other webpages or other eCommerce platforms and/or portals for the one or more fashion products. For example, a user (e.g., user 46) may access website (e.g., website 300) via a browser of a computing device (e.g., computing device 38). The user (e.g., user 46) may select an image of a fashion product (e.g., fashion product 302) on a first webpage of the website (e.g., website 300) or some other user-selectable link associated with a fashion product (e.g., fashion product 302). In response to selecting the image of fashion product (e.g., fashion product 302), or other user-selectable link associated with the fashion product, the browser may navigate the user (e.g., user 46) to a second webpage (not shown) of the website, where the user (e.g., user 46) may be shown various images of the selected fashion product (e.g., fashion product image 310) and/or a description of the fashion product. While an example including two webpages of a website has been discussed, it will be appreciated that any number of webpages are possible within the scope of the present disclosure.

In some embodiments, cognitive fashion product recommendation process 10 may associate 200 one or more fashion products on a website with a user accessing the website by processing a user's browsing history of the website. For example, while browsing the website for one or more fashion products, a user (e.g., user 46) may generate a browsing history on the browser of the computing device associated with the user. In some embodiments, the browsing history of the website may include a user's session and/or navigation history on the website, which may include, but is not limited to, what fashion product is the user currently viewing, which category and/or sub-category of fashion-products is the user currently viewing, what fashion products have been viewed by the user and in what sequence, which recommended items in the present session were provided to the user, of the recommendations provided to the user, which recommendations were selected (e.g., clicked) and which were rejected (e.g., not selected), etc.

In some embodiments, processing a user's browsing history of the website may include receiving login information associated with a user account and processing browsing history associated with the user account. For example, the website (e.g., website 300) may provide user account services to enable a user to create an account on the web site (e.g., via login accessibility button 330). When a user is logged into his or her account on the website, cognitive fashion product recommendation process 10 may record or otherwise monitor the user's browsing history to determine which fashion products the user views, selects, searches for, adds to the shopping cart (e.g., shopping cart 326), adds to the wish list (e.g., wish list 328), and/or purchases from the website.

In some embodiments, a user may not have an account on the website and/or may not be logged into an account on the website. While browsing the website, cognitive fashion product recommendation process 10 may process one or more cookies (e.g., cookie 64) on the browser and/or on the computing device (e.g., computing device 38) associated with the user (e.g., user 46) to associate one or more fashion products with the user. For example, while browsing the website (e.g., website 300), cognitive fashion product recommendation process 10 may provide one or more cookies (e.g., cookie 64), or other storage mechanisms, to store a unique identifier and a record of webpages of the website the user (e.g., user 46) has accessed. In some embodiments, the unique identifier may be used to associate a browser with a record of webpages of the website the user has accessed. In some embodiments, the one or more cookies (e.g., cookie 64) may indicate which fashion products have been added to the shopping cart (e.g., shopping cart 326) and/or the wish list (e.g., wish list 328). Cognitive fashion product recommendation process 10 may request and collect the one or more cookies (e.g., cookie 64) from the browser of the computing device (e.g., computing device 38) associated with the user and may process the one or more cookies (e.g., cookie 64) to determine which fashion products the user has viewed, selected, searched for, added to the shopping cart (e.g., shopping cart 324), added to the wish list (e.g., wish list 328), purchased from the website, etc. While cookies have been described as an example storage mechanism used in storing and processing a user's browsing history, it will be appreciated that other storage mechanisms are possible and are within the scope of the present disclosure.

In some embodiments, associating 200 the one or more fashion products with the user may include classifying the user as one or more of a non-customer and a customer. For example, a user (e.g., user 46) may access the website (e.g., website 300) for the first time. In this situation, the user may not have an account on the website and may not have any cookies (e.g., cookie 64) or other storage mechanism from which cognitive fashion product recommendation process 10 may process the user's browsing history on the website. In such cases, cognitive fashion product recommendation process 10 may classify the user as a "non-customer". In response to classifying the user as a non-customer, cognitive fashion product recommendation process 10 may record or otherwise monitor the user's browsing history (e.g., in the form of cookies or other storage mechanisms) and may process the browsing history after a pre-defined period of time and/or after a pre-defined number of fashion products have been browsed (e.g., viewed, selected, etc.). After processing the browsing history, cognitive fashion product recommendation process 10 may define a fashion product browsing sequence for the non-customer user including a sequence of one or more fashion products viewed by the non-customer. For example and in some embodiments, it may be assumed that when a user is classified as a non-customer, the user has not added any fashion products to the shopping cart (e.g., shopping cart 324) and/or has not purchased any fashion products from the website. In some embodiments, cognitive fashion product recommendation process 10 may define a priority/preference score for each fashion product in the fashion product browsing sequence defined for the non-customer based upon, at least in part, how recently each fashion product was viewed and/or for how long the non-customer viewed each fashion product. As will be discussed in greater detail below, the sequence may provide a ranking or priority by which cognitive fashion product recommendation process 10 provides the one or more fashion product recommendations to the user.

In some embodiments, cognitive fashion product recommendation process 10 may classify a user as a "customer" if cognitive fashion product recommendation process 10 receives login information from the user for a user account on the website and/or if cognitive fashion product recommendation process 10 collects one or more cookies (e.g., cookie 64) from the browser and/or the computing device associated with the user. In some embodiments, cognitive fashion product recommendation process 10 may process the customer's browsing history of the website (e.g., as discussed above) to determine a fashion product browsing sequence. In some embodiments, the fashion product browsing sequence may include a sequence of one or more fashion products viewed by the customer, one or more fashion products added to the shopping cart (e.g., shopping cart 324) by the customer, and/or one or more fashion products purchased by the customer. In some embodiments, cognitive fashion product recommendation process 10 may divide the fashion product browsing sequence into a first group including fashion products added to the shopping cart and fashion products purchased and a second group including fashion products viewed by the customer. While two groups have been discussed, it will be appreciated that the fashion product browsing sequence may be divided into any number of groups within the scope of the present disclosure. As will be discussed in greater detail below and in some embodiments, the fashion browsing sequence may provide a ranking or priority by which cognitive fashion product recommendation process 10 provides the one or more fashion product recommendations to the user.

In some embodiments, cognitive fashion product recommendation process 10 may provide 202, on the website, one or more recommendations to the user for fashion products based upon, at least in part, one or more fashion-ability scores representative of the one or more fashion products associated with the user on the website and one or more fashion-ability scores representative of the one or more fashion products on the website. In some embodiments, a fashion-ability score may be a numerical representation of a fashion product defined for one or more attributes associated with the one or more fashion products. Cognitive fashion product recommendation process 10 may generate one or more fashion-ability scores representative of one or more fashion products. In some embodiments, generating the one or more fashion-ability scores representative of the one or more fashion products based upon, at least in part, processing one or more images of the one or more fashion products.

Figure 4:
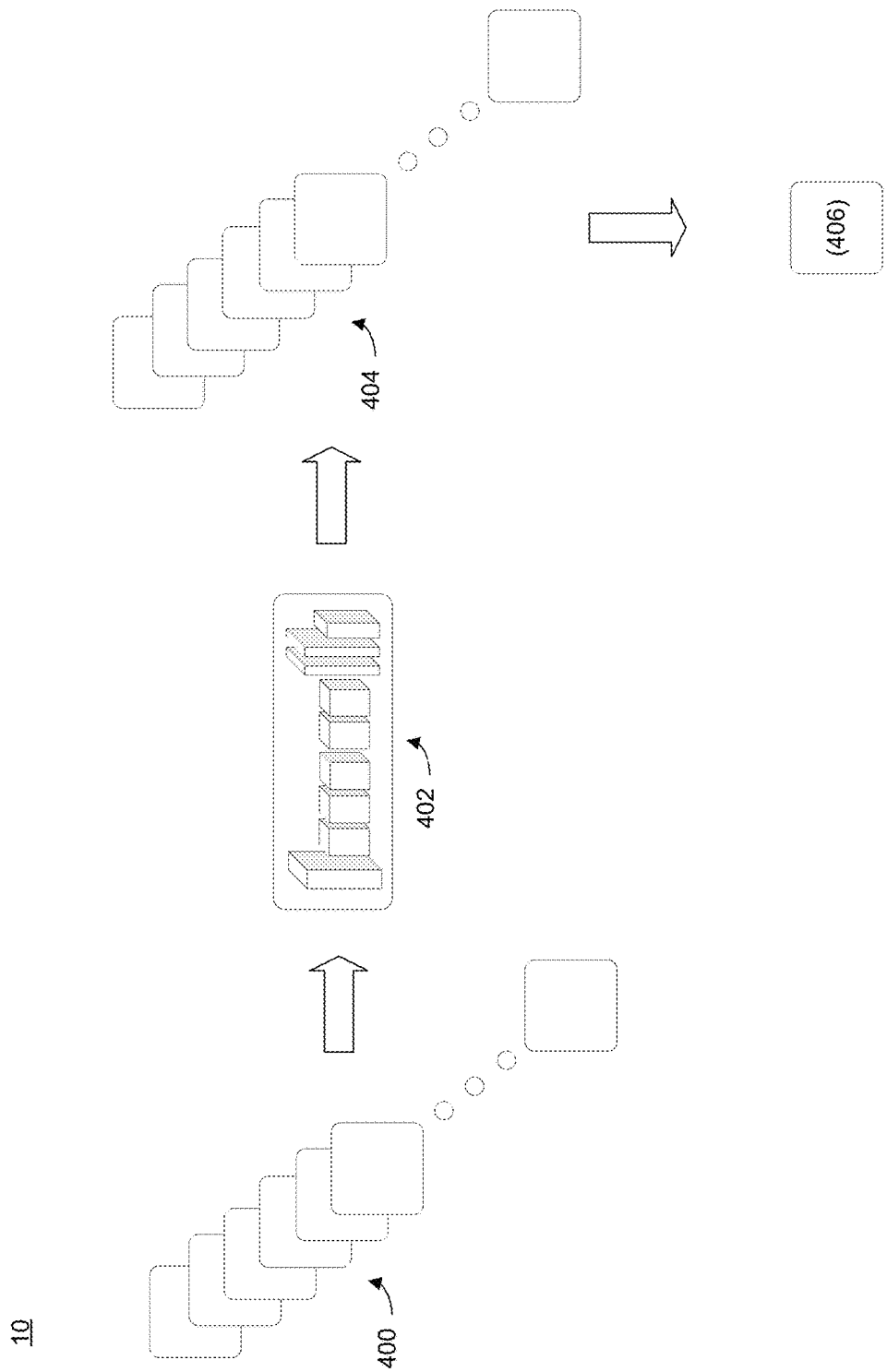
FIG. 4 is an example diagrammatic view of the processing of images to generate one or more fashion-ability tensors and the generation of one or more fashion-ability scores representative of one or more fashion products according to one or more example embodiments of the disclosure.

For example and referring also to FIG. 4, cognitive fashion product recommendation process 10 may receive one or more images of one or more fashion products (e.g., images 400). The one or more images (e.g., images 400) may be digital representations displayed on a user interface and/or may be physical photographs or reproduction of photographs. In some embodiments, cognitive fashion product recommendation process 10 may receive the plurality of images (e.g., images 400) via a camera system. Additionally, the one or more images of the one or more fashion products (e.g., images 400) may be received from a computing device (e.g., client electronic devices 38, 40, 42, 44 (and/or computing device 12)). It will be appreciated that the one or more images of the one or more fashion products (e.g., images 400) may be received in various ways within the scope of the present disclosure. In some embodiments, the one or more images (e.g., images 400) may be stored in a repository or other database for processing.

In some embodiments, cognitive fashion product recommendation process 10 may receive metadata associated with the one or more images. For example, for each image, cognitive fashion product recommendation process 10 may receive metadata corresponding to different characteristics or attributes of the one or more images of the one or more fashion products. In some embodiments, metadata may be visual or non-visual (e.g., tags, features extracted from description, brand, color, price, price history, discounts, etc.) Examples of the metadata associated with the one or more images may include, but is not limited to, categories of the one or more fashion products, materials of the one or more fashion products, patterns of the one or more fashion products, age groups associated with the one or more fashion products, gender associated with the one or more fashion products, price associated with the one or more fashion products, the trendiness of the one or more fashion products, the highest year trending of the one or more fashion products, the number of social media likes associated with the one or more fashion products, survey responses associated with one or more fashion products, etc. As will be discussed in greater detail below, the metadata associated with the one or more images may be used as a training classification or attribute when processing the one or more images by cognitive fashion product recommendation process 10. In some embodiments, the metadata may be categorical (e.g., movies or television programs in which this fashion product appeared), continuous (e.g., price of fashion product), and/or a combination of categorical and continuous (e.g., price perception by age).

In some embodiments, cognitive fashion product recommendation process 10 may define one or more categories associated with the one or more fashion products based upon, at least in part, the one or more images (e.g., images 400) and the metadata associated with the one or more images. For example, cognitive fashion product recommendation process 10 may define categories associated with the one or more fashion products to include categories such as outerwear, innerwear, coats, jackets, hats, scarves, dresses, shoes, socks, shirts, blouses, pants, skirts, ties, suits, etc. based upon the one or more images and the metadata associated with the one or more images. While several possible categories for the one or more fashion products have been provided, it will be appreciated that other categories are possible within the scope of the present disclosure. In some embodiments, cognitive fashion product recommendation process 10 may define one or more sub-categories for the one or more categories. For example, cognitive fashion product recommendation process 10 may define sub-categories associated with the category the "shirts" category to include men's shirts, women's shirts, boy's shirts, girl's shirts, t-shirts, novelty t-shirts, long-sleeve shirts, sleeveless shirts, workout shirts, swimming shirts, etc. While several possible sub-categories for the "shirts" category have been provided, it will be appreciated that other sub-categories are possible within the scope of the present disclosure for various categories defined for the one or more fashion products.

Referring again to FIG. 4 and in some embodiments, cognitive fashion product recommendation process 10 may process the one or more of images of the one or more fashion products (e.g., images 400) to generate one or more fashion-ability tensors. In some embodiments, cognitive fashion product recommendation process 10 may process the one or more images (e.g., images 400) using a neural network. For example, cognitive fashion product recommendation process 10 may receive the one or more images (e.g., images 400) and may process the one or more images via a neural network (e.g., neural network 402). A neural network may generally include a computing system that "learns" to do tasks by processing examples. In some embodiments, a neural network is able to differentiate images from one another by analyzing a plurality of example images across one or more attributes. From this "training" with pre-identified images, a neural network (e.g., neural network 402) is able to generally identify a similar image and/or differentiate an image against other images for a given attribute or dimension. For example and as discussed above, metadata associated with the one or more images may be used as attributes or dimensions to train the one or more images on the neural network (e.g., neural network 402) of cognitive fashion product recommendation process 10. Additional details regarding neural networks are described, for example, in Sewak, M., Md, Karim, R., & Pujaru, P. (2018) *Practical Convolutional Neural Networks*. (pp. 91-113). Birmingham, UK: Packt Publishing, which is incorporated herein by reference.

In some embodiments, processing the one or more images of the one or more fashion products may include selecting one or more images to process via the neural network (e.g., neural network 402). For example, cognitive fashion product recommendation process 10 may receive some training data (e.g., one or more images of the one or more fashion products) and test and validation data (e.g., one or more examples images of one or more fashion products). In some embodiments, the selection of which images to process may be automatic and/or may be defined manually by a user (e.g., using a user interface). In some embodiments, the selection of training data may be based upon, at least in part, the one or more categories and/or one or more sub-categories defined for the one or more fashion products shown in the one or more images. For example, certain models or types of neural network (e.g., neural network 402) may perform better (e.g., more discrete classification of images) for certain categories and/or sub-categories of fashion products. In experiments conducted by the Applicant, the model architecture or type of neural network (e.g., neural network 402) that may best define fashion-ability scores for different categories and/or different sub-categories of fashion products may differ and hence one-size or one neural network model may not fit all categories and/or sub-categories of fashion products. In some embodiments, cognitive fashion product recommendation process 10 may provide the flexibility to cognitively identify and select the right artificial-intelligence methodology/topology/neural network (e.g., neural network 402) to process the one or more images of a particular category and/or sub-category of fashion product to generate the one or more fashion-ability scores.

In some embodiments, cognitive fashion product recommendation process 10 may include a repository or other data structure including one or more model architectures or types of neural networks (e.g., neural network 402) to process the one or more images of the one or more fashion products (e.g., images 400). Examples of models or types of neural networks may generally include VGG16 Model Architecture, GoogLeNet, LeNet, ResNet, Inception, Xception, etc. It will be appreciated that various models or types of neural networks (e.g., neural network 402) may be used within the scope of the present disclosure. For example, any neural network or other model architecture configured for deep learning may be used within the scope of the present disclosure to process the one or more images of the one or more fashion products.

In some embodiments, cognitive fashion product recommendation process 10 may select a model architecture or type of neural network (e.g., neural network 402) based upon, at least in part, the one or more categories and/or sub-categories of the one or more images of the one or more fashion products (e.g., images 400). In some embodiments, a model may be trained for each category and/or each sub-category. In some embodiments, cognitive fashion product recommendation process 10 may select one or more attributes to train the neural network (e.g., neural network 402) with. For example, a neural network (e.g., neural network 402) may be trained to differentiate one or more images from a particular category or sub-category across the selected attribute. An attribute selected for training a neural network may also be referred to as a dimension. Cognitive fashion product recommendation process 10 may train the selected model or type of neural network (e.g., neural network 402) with the one or more images of the one or more fashion products across the selected attribute. In some embodiments, cognitive fashion product recommendation process 10 may store the trained neural network in a repository or other data structure.

In some embodiments, cognitive fashion product recommendation process 10 may generate one or more fashion-ability tensors (e.g., fashion-ability tensors 404) representative of the one or more fashion products for various models or types of neural networks. For example, cognitive fashion product recommendation process 10 may retrieve each trained neural network and score each of the one or more images against every attribute or dimension that the neural network is trained for. In some embodiments, the scoring of each image may generate one or more scored vectors, where each vector corresponds to a particular attribute used to train the neural network. Cognitive fashion product recommendation process 10 may join each of the scored vectors for a particular fashion product or image of the fashion product to form a multi-dimensional vector or fashion-ability tensor (e.g., fashion-ability tensors 404) corresponding to the visual representation of the fashion product.

In some embodiments, cognitive fashion product recommendation process 10 may generate the one or more fashion-ability scores representative of the one or more fashion products by selecting an attribute or dimension for generating a fashion-ability score and retrieving the vector trained for the selected attribute from the fashion-ability tensor for the fashion product (e.g., fashion-ability tensors 404). In response to retrieving the vector trained for the selected attribute from the fashion-ability tensor for the fashion product (e.g., fashion-ability tensors 404), cognitive fashion product recommendation process 10 may produce a fashion-ability score (e.g., fashion-ability score 406) that represents a fashion product for the selected dimension. For example, cognitive fashion product recommendation process 10 may select one or more attributes to define a fashion-ability score (e.g., fashion-ability score 406) for (e.g., trendiness of a fashion product for a given age-group). Cognitive fashion product recommendation process 10 may retrieve the vector from the fashion-ability tensor (e.g., fashion-ability tensors 404) for e.g., trendiness for a given age group to generate the one or more fashion-ability scores (e.g., fashion-ability score 406) representative of the one or more fashion products for the selected attribute of e.g., trendiness of a fashion product for a given age-group. In some embodiments, the generated fashion-ability score for the one or more fashion products (e.g., fashion-ability score 406) may represent the e.g., trendiness of a fashion product for a given age-group as a score. For example and in some embodiments, a higher fashion-ability score (e.g., fashion-ability score 406) may indicate that a particular fashion product is e.g., more trendy among a given age-group and a lower fashion-ability score (e.g., fashion-ability score 406) may indicate that a particular fashion product is e.g., less trendy among the given age-group. While the example attribute of "trendiness of a fashion product for a given age-group" has been discussed, it will be appreciated that various attributes or combinations of attributes may be used to generate fashion-ability scores within the scope of the present disclosure.

In some embodiments, cognitive fashion product recommendation process 10 may generate the one or more fashion-ability scores representative of the one or more fashion products based upon, at least in part, the category and/or sub-category of fashion associated with each fashion product. For example, cognitive fashion product recommendation process 10 may compute or otherwise generate a fashion-ability score of a fashion product within its fashion category and/or subcategory. As will discussed in greater detail below, the ability to provide recommendations for fashion products from different but complimentary sub-categories of fashion based upon, at least in part, the fashion-ability scores representative of the fashion products may allow cognitive fashion product recommendation process 10 to provide recommendations for fashion products beyond fashion products the user has already viewed or purchased.

As will be discussed in greater detail below, cognitive fashion product recommendation process 10 may provide 202 the one or more recommendations to the user for fashion products based upon, at least in part, one or more fashion-ability scores representative of the one or more fashion products associated with the user and one or more fashion-ability scores representative of the one or more fashion products on the website. As discussed above, the one or more fashion-ability scores (e.g., fashion-ability score 406) may be generated from fashion-ability tensors generated for each fashion product. As such, providing recommendations to the user for fashion products based upon, at least in part, the one or more fashion-ability scores representative of the one or more fashion products may include providing recommendations to the user for fashion products based upon, at least in part, the one or more fashion-ability tensors associated with the one or more fashion products. For example, cognitive fashion product recommendation process 10 may provide 202 the one or more recommendations to the user for fashion products based upon, at least in part, the one or more fashion-ability scores representative of the one or more fashion products associated with the user and the one or more fashion-ability scores representative of the one or more fashion products on the website and/or based upon, at least in part, the one or more fashion-ability tensors associated with the one or more fashion products associated with the user and the one or more fashion-ability tensors associated with the one or more fashion products on the website.

In some embodiments, cognitive fashion product recommendation process 10 may provide 202 the one or more recommendations to the user for fashion products by generating one or more fashion-ability scores representative of the one or more fashion products associated with the user and one or more fashion-ability scores representative of the one or more fashion products on the website. For example and as discussed above, cognitive fashion product recommendation process 10 may process the one or more images of the one or more fashion products on the website to generate a fashion-ability tensor associated with each of the one or more fashion products on the website (e.g., fashion-ability tensors 404). In some embodiments, cognitive fashion product recommendation process 10 may process the one or more images of the one or more fashion products associated with the user to generate a fashion-ability tensor associated with each of the one or more fashion products associated with the user (e.g., fashion-ability tensors 404). For example, the one or more fashion products associated with the user may include one or more fashion products that are not included in the fashion-ability tensors associated with the one or more fashion products on the website (e.g., new products, products from a different website, etc.). In some embodiments, the one or more fashion products associated with the user may have fashion-ability tensors that were generated previously (e.g., for fashion products already on the website). As discussed above, from these fashion-ability tensors, cognitive fashion product recommendation process 10 may generate the one or more fashion-ability scores representative the one or more fashion products associated with the user and the one or more fashion products on the website.

In some embodiments, cognitive fashion product recommendation process 10 may determine a similarity between one or more fashion products. In some embodiments, cognitive fashion product recommendation process 10 may convert an image of a fashion product into pixel intensities across channels (e.g., RGB), may preform dimension reduction to reduce computational load, and then may apply vector similarity formula like (Cosine Similarity, Pearson Similarity etc.) on the so obtained vectors tensors. This may require IN (e.g. square root of N) complexity (e.g., where N is the number of images) as each image is compared with every other image. In some embodiments, cognitive fashion product recommendation process 10 may use indexing based approximate similarity algorithms like ANNOY (approximate nearest neighbor) to determine a similarity between one or more fashion products.

In some embodiments, cognitive fashion product recommendation process 10 may determine a similarity between one or more fashion products by using one or more layers of a neural network (e.g., neural network 702). For example, in deep learning, one way of determining similarity between images of fashion products is to obtain the flattened layer of the image as obtained from the last fully connected layer of a pre-trained neural network. Additional details regarding this process are described, for example, in Sewak, M., Md, Karim, R., & Pujaru, P. (2018). *Practical Convolutional Neural Networks*. (pp. 103-113). Birmingham, UK: Packt Publishing, which is incorporated herein by reference.

In some embodiments, cognitive fashion product recommendation process 10 may determine a similarity between one or more fashion products based upon, at least in part, the one or more fashion-ability tensors (e.g., fashion-ability tensor 704). In some embodiments, instead of a flattened layer from a neural network as discussed above, cognitive fashion product recommendation process 10 may use a flattened output of a fashion-ability score and may drive similarities between fashion products from these fashion-ability scores (e.g., fashion-ability score 706) (e.g., using ANNOY or other similarity computation as discussed above). In some embodiments, cognitive fashion product recommendation process 10 may use one or more fashion-ability tensors (e.g., fashion-ability tensor 704), which may be flattened and used to determine similarity between one or more fashion products.

Figure 5:
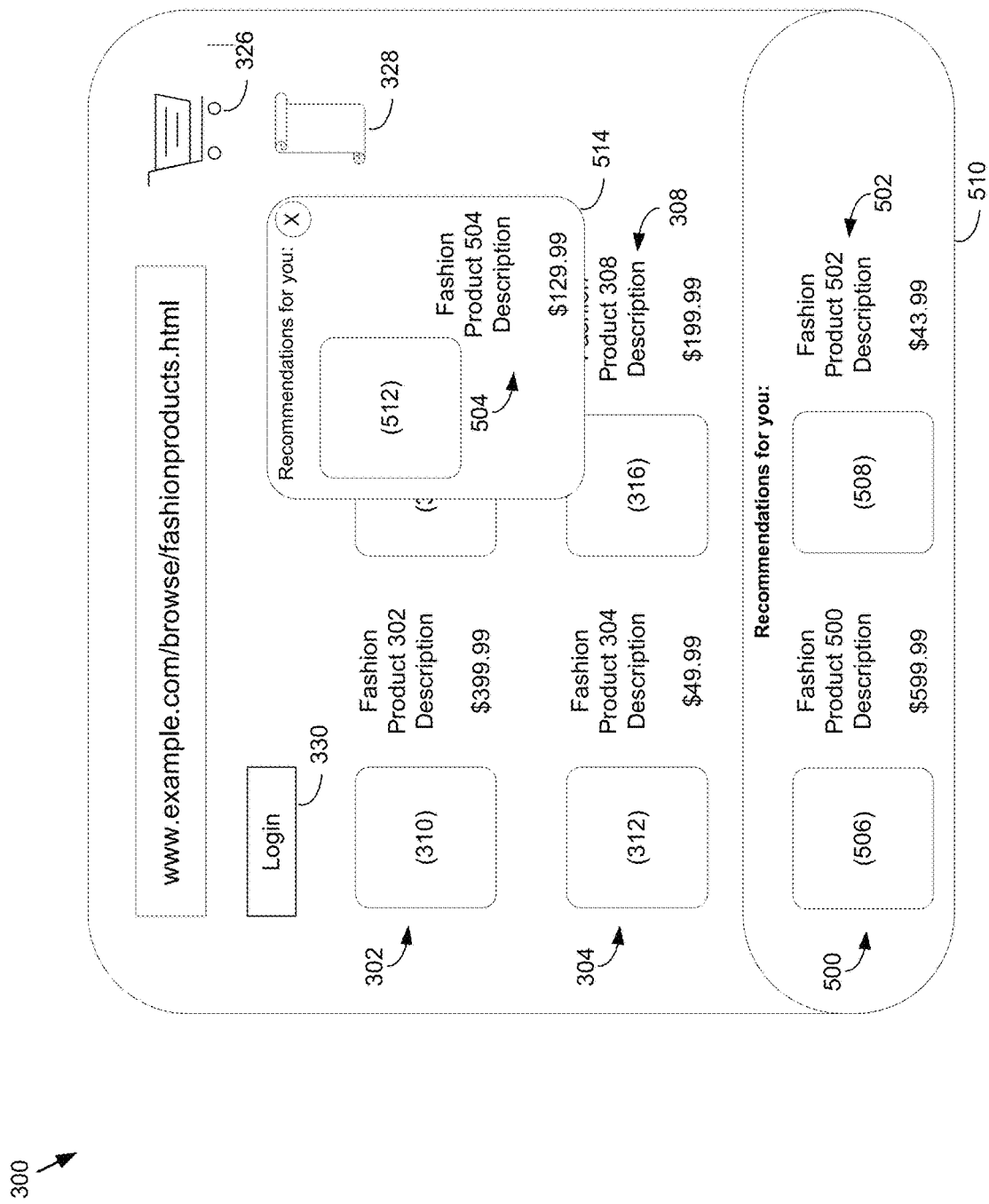
FIG. 5 is an example diagrammatic view of an eCommerce platform with one or more recommendations for one or more fashion products according to one or more example embodiments of the disclosure.

In some embodiments, cognitive fashion product recommendation process 10 may provide 202 one or more recommendations to the user for fashion products based upon, at least in part, one or more fashion-ability scores representative of the one or more fashion products associated with the user on the website and one or more fashion-ability scores representative of the one or more fashion products on the website. Referring also to FIG. 5 and in some embodiments, cognitive fashion product recommendation process 10 may provide the one or more recommendations for one or more fashion products (e.g., fashion product recommendations 500, 502, 504) on the website (e.g., website 300). While two fashion product recommendations are shown in FIG. 5, it will be appreciated that any number of fashion product recommendations are possible within the scope of the present disclosure. In some embodiments, providing the one or more recommendations for one or more fashion products (e.g., fashion product recommendations 500, 502) may include providing the one or more recommendations for rendering one or more images of the one or more recommended fashion products (e.g., recommended fashion product images 506, 508) at a client device. For example, cognitive fashion product recommendation process 10 may provide the one or more fashion product recommendations (e.g., fashion product recommendations 500, 502) to a client device for rendering within a designated window (e.g., recommendation window 510) or portion of the website. In some embodiments, the designated window (e.g., recommendation window 510) or portion of the website may include a subset of the one or more fashion product recommendations.

For example and as will be discussed in greater detail below, cognitive fashion product recommendation process 10 may identify several fashion products to recommend to the user based upon, at least in part, the fashion-ability score of the one or more fashion products associated with the user. In some embodiments, cognitive fashion product recommendation process 10 may provide a subset of the one or more identified fashion products in the designated window (e.g., recommendation window 510) or portion of the website. In some embodiments, as the user selects on a fashion product recommendation, cognitive fashion product recommendation process 10 may replace the selected fashion product recommendation with another fashion product recommendation (e.g., by rendering the image of the next fashion product recommendation). In some embodiments, cognitive fashion product recommendation process 10 may provide the one or more fashion product recommendations (e.g., fashion product 504 with image 512) within a pop-up window (e.g., pop-up recommendation window 514) or other separate window from the website. In some embodiments, providing the one or more recommendations for one or more fashion products (e.g., fashion product recommendations 500, 502) may include rendering one or more images of the one or more recommended fashion products (e.g., recommended fashion product images 506, 508) on the website. Rendering may generally include server-side rendering (i.e., receiving a request for a website from a browser and providing rendered HTML code from the server to the browser for displaying the website on the browser) and/or client-side rendering (i.e., receiving a request for a website from a browser and providing JavaScript to the browser from a server which makes additional requests for content which is used to generate HTML code at the browser). In this manner and in some embodiments, cognitive fashion product recommendation process 10 may provide rendered e.g. HTML code including the one or more digital advertisements (e.g., server-side rendering) and/or may provide the one or more digital advertisements as e.g. JavaScript Object Notation (JSON) data in response to a e.g. JavaScript request, which may be used to generate HTML code including the one or more digital advertisements (e.g., client-side rendering). It will be appreciated that the above description of rendering is for example purposes only and that other methodologies for rendering digital advertisements is within the scope of the present disclosure. As used herein and where appropriate, "rendering" and "providing for rendering" may be used interchangeably within the scope of the present disclosure.

In some embodiments, providing 202 the one or more recommendations to the user for fashion products may include providing 204 one or more recommendations for one or more fashion products on the website with a fashion-ability score within a threshold of the fashion-ability score representative of the one or more fashion products associated with the user. In some embodiments, cognitive fashion product recommendation process 10 may recommend one or more fashion products on the website with a fashion-ability score within a pre-defined threshold of the fashion-ability score representative of the one or more fashion products associated with the user. In some embodiments, the threshold may be automatically defined (e.g., by cognitive fashion product recommendation process 10) and/or may be manually defined by a user (e.g., via a user interface). In some embodiments, cognitive fashion product recommendation process 10 may recommend one or more fashion products on the web site from the same category and/or sub-category as the one or more fashion products associated with the user and with a fashion-ability score within a pre-defined threshold of the one or more fashion-ability scores representative of the one or more fashion products associated with the user. For example, suppose a user is associated (e.g., by viewing, purchasing, etc.) with a particular dress (e.g., fashion product 304), cognitive fashion product recommendation process 10 may provide 204 a recommendation for another dress (e.g., from same category and/or sub-category) with a fashion-ability score (e.g., 0.7) within a predefined threshold (e.g., 0.05) of the fashion-ability score of the dress associated with the user (e.g., 0.74). While an example of a dress has been provided with an example fashion-ability score of e.g., 0.74, it will be appreciated that other fashion products, categories or sub-categories of fashion products, pre-defined thresholds, and fashion-ability scores are possible within the scope of the present disclosure.

In some embodiments, providing 204 the one or more recommendations for one or more fashion products on the website with a fashion-ability score within a threshold of the fashion-ability score of the one or more fashion products associated with the user may include providing 206 one or more recommendations for one or more fashion products on the web site from a different category than a category of the one or more fashion products associated with the user. In some embodiments, this may be referred to as a cross-sell. For example, some of the most important aspects of any retail business may be customer engagement and repeat sales. A retail house valuation may be based on customer retention and repeat sales which may be a direct outcome of cross-selling fashion products. As such, cognitive fashion product recommendation process 10 may provide recommendations for other fashion products (e.g., from a different category and/or sub-category) that are part of the user's fashion taste as determined by the fashion-ability-scores of the fashion products associated with the user. For example, suppose a user is associated (e.g., by viewing, purchasing, etc.) with a particular dress (e.g., fashion product 304), cognitive fashion product recommendation process 10 may provide 208 a recommendation for a scarf (e.g., fashion product 502) (e.g., from a different category and/or sub-category) with a fashion-ability score (e.g., 0.7) within a predefined threshold (e.g., 0.05) of the fashion-ability score of the dress associated with the user (e.g., 0.74). While an example of a dress has been provided with an example fashion-ability score of e.g., 0.74, it will be appreciated that other fashion products, categories or sub-categories of fashion products, pre-defined thresholds, and fashion-ability scores are possible within the scope of the present disclosure.

In some embodiments, providing 202 the one or more recommendations to the user for fashion products may include providing 208 one or more recommendations for one or more fashion products on the website with a fashion-ability score greater than the fashion-ability score of the one or more fashion products associated with the user. For example, suppose a user is associated (e.g., by viewing, purchasing, etc.) with a particular dress (e.g., fashion product 304), cognitive fashion product recommendation process 10 may provide 210 a recommendation for a pair of shoes (e.g., from a different category and/or sub-category) with a fashion-ability score (e.g., 0.8) within a predefined threshold (e.g., 0.06) of the fashion-ability score of the dress associated with the user (e.g., 0.74). In some embodiments, the predefined threshold may be automatically defined (e.g., by cognitive fashion product recommendation process 10) and/or may be manually defined by a user (e.g., via a user interface) to slowly and incrementally increase the user's fashion taste. In another example, suppose a user is associated (e.g., by viewing, purchasing, etc.) with a particular dress, cognitive fashion product recommendation process 10 may provide 210 a recommendation for another dress (e.g., from the same category and/or sub-category) with a fashion-ability score (e.g., 0.79) within a predefined threshold (e.g., 0.06) of the fashion-ability score of the dress associated with the user (e.g., 0.74).

In some embodiments, providing 202 the one or more recommendations to the user for fashion products may include providing 210 one or more recommendations for one or more fashion products on the website from the same category as the fashion products associated with the user that have fashion-ability scores within a threshold of the fashion-ability score of the one or more fashion products associated with the user and that have a price greater than a price of the one or more fashion products associated with the user. In some embodiments, this may be referred to as an up-sell. For example, some of the most important aspects of any retail business may be customer engagement and repeat sales. A retail house valuation may be based on customer retention and repeat sales which may be a direct outcome of up-selling fashion products. As such, cognitive fashion product recommendation process 10 may provide recommendations for other fashion products (e.g., from the same category as the fashion products with a higher price and comparable fashion-ability score) that are part of the user's fashion taste as determined by the fashion-ability-scores of the fashion products associated with the user. For example, suppose a user is associated (e.g., by viewing, purchasing, etc.) with a particular suit (e.g., fashion product 302) at a price of e.g., $399.99, cognitive fashion product recommendation process 10 may provide 206 a recommendation for another suit (e.g., fashion product 500) from the same category and/or sub-category with a fashion-ability score (e.g., 0.72) within a predefined threshold (e.g., 0.05) of the fashion-ability score of the suit (e.g., fashion product 302) associated with the user (e.g., 0.74) at a higher price (e.g., $599.99).

In some embodiments, providing 202 the one or more recommendations to the user for fashion products may include providing 212 one or more recommendations for one or more newly added fashion products based upon, at least in part, the one or more fashion-ability scores representative of the one or more fashion products associated with the user on the website and one or more fashion-ability scores representative of the one or more newly added fashion products. In some embodiments, a new fashion product may be added to a website and may not be recommended by traditional recommendation systems because there may not be any user purchase interactions to use upon which a recommendation may be based. For example, suppose a user is associated (e.g., by viewing, purchasing, etc.) with a particular sweater with a fashion-ability score (e.g., 0.65) and suppose a new scarf (e.g., fashion product 502) is added to the website (e.g., website 300). Cognitive fashion product recommendation process 10 may provide 204 a recommendation for the newly added scarf (e.g., fashion product 502) with a fashion-ability score (e.g., 0.7) based upon, at least in part, the fashion-ability score of the newly added scarf (e.g., fashion product 502) and the fashion-ability score of the sweater. That is, because of the fashion-ability scores generated for the newly added scarf (e.g., fashion product 502) and the sweater associated with the user, cognitive fashion product recommendation process 10 may provide 202 a recommendation for the newly added scarf despite the lack of purchase information (e.g., by other customers) associated with the scarf.

Figure 6:
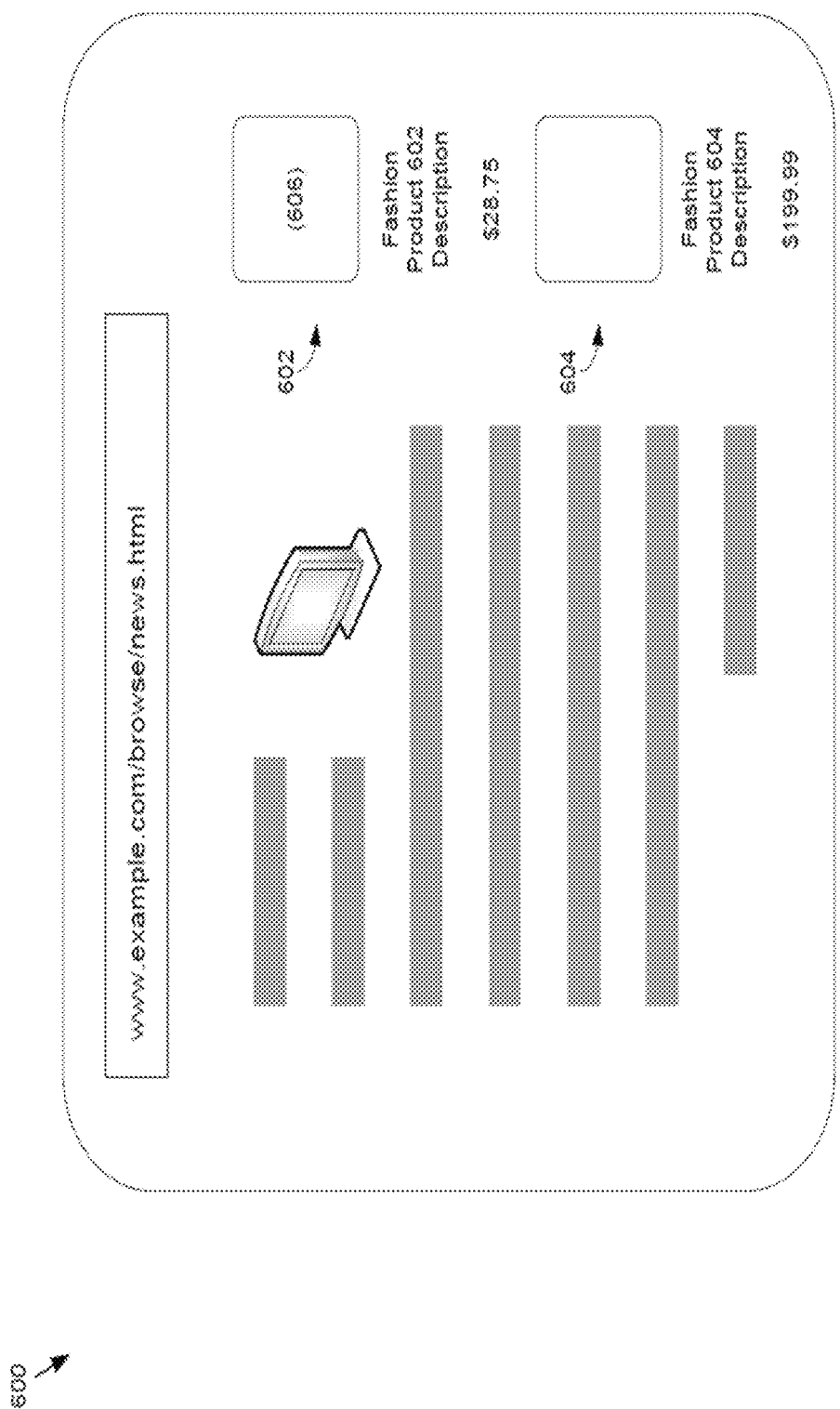
FIG. 6 is an example diagrammatic view of a separate an eCommerce platform with one or more fashion products displayed as digital advertisements according to one or more example embodiments of the disclosure.

Referring also to FIG. 6 and in some embodiments, cognitive fashion product recommendation process 10 may determine 214 that the user is accessing the website in response to a user selection of a digital advertisement displayed on a different website. Since it may be desirable to acquire as many new customers as feasible through digital marketing, and once they are onboard, to keep engaging them with products that they may like, without having much knowledge about their taste except the information about the campaign through which they were on-boarded (e.g., clicked on an advertisement to reach the website), it may be desirable to have an integration with cognitive fashion product recommendation process 10 and a digital marketing platform to ensure that the newly on-boarded customer is engaged with the recommendations for relevant fashion products. As such, embodiments of cognitive fashion product recommendation process 10 may find similar existing or other new on-boarded customers and match their fashion-ability scores and/or fashion liking to suggest fashion products and sub-categories which this new user may be interested in and may integrate the liking insight of the user and have recommendations ready for customers on-boarded with an integrated digital marketing campaign to optimize engagement and conversion of new users to customers. For example, a user (e.g., user 46) may access a different website (e.g., website 600). While navigating a webpage on the website (e.g., website 600), cognitive fashion product recommendation process 10 may provide one or more digital advertisements (e.g., digital advertisements 602, 604) to a client device (e.g., for client-side rendering) and/or to a server device (e.g., for server-side rendering) for rendering on the website (e.g., website 600). In some embodiments, a user (e.g., user 46) may select one of the digital advertisements and the browser may navigate the user (e.g., user 46) to the website (e.g., website 300) including the one or more fashion products. In some embodiments, cognitive fashion product recommendation process 10 may determine 216 the one or more fashion products shown in the digital advertisement displayed on the different website. For example, digital advertisement 602 may include an image of a pair of shoes (e.g., fashion product image 606) available for purchasing on website 300. In some embodiments, cognitive fashion product recommendation process 10 may provide 218 one or more recommendations for one or more fashion products based upon, at least in part, one or more fashion-ability scores representative of the one or more fashion products shown in the digital advertisement displayed on the different website (e.g., website 600) and the one or more fashion-ability scores representative of the one or more fashion products on the website (e.g., website 300). For example and as discussed above, cognitive fashion product recommendation process 10 may provide 218 one or more recommendations for one or more fashion products on the website (e.g., website 300) with a fashion-ability score within a pre-defined threshold of the fashion-ability score representative of the one or more fashion products associated with the user. In some embodiments, cognitive fashion product recommendation process 10 may provide 218 one or more recommendations for one or more fashion products on the website (e.g., website 300) from a different category than a category of the one or more fashion products associated with the user. In addition, cognitive fashion product recommendation process 10 may provide 218 one or more recommendations for one or more fashion products on the website (e.g., website 300) from the same category as the fashion products associated with the user that have fashion-ability scores within a threshold of the fashion-ability score of the one or more fashion products associated with the user and that have a price greater than a price of the one or more fashion products associated with the user.

In some embodiments, cognitive fashion product recommendation process 10 may provide 202 one or more recommendations to the user for one or more fashion products based upon, at least in part, the one or more fashion-ability scores representative of the one or more fashion products associated with the user on the website and one or more fashion-ability scores representative of one or more fashion products associated with other users of the website. For example, cognitive fashion product recommendation process 10 may identify similar existing or new customers and match their fashion-ability scores for fashion products the other customers are associated with (e.g., within a pre-defined threshold) to provide recommendations for fashion products, categories of fashion products, and/or sub-categories of fashion products to the user.

In some embodiments, cognitive fashion product recommendation process 10 may pair the one or more recommendations with one or more purchasing incentives based upon, at least in part, the one or more fashion-ability scores representative of the one or more fashion products on the website. Fashion products have very complex price elasticity distributions, which may significantly change their behavior across different fashion-ability scores. Moreover, price elasticity distribution may not remain constant, but may change dynamically with time or other social conditions, economic conditions, cultural conditions, etc. For example, one fashion product which has a higher fashion-ability score at a given time may assume a price elasticity distribution with negative trend elasticity at that fashion-ability score range, and after some time after the fashion product starts moving from fashion shows to "Page-3 parties", it may assume a flatter distribution, followed by positive distribution by mass adoption. Getting this concept wrong may not only severely harm the revenues and conversion for a retail channel, but may severely impact branding and business viability for specific fashion appeal or fashion products. In some embodiments, cognitive fashion product recommendation process 10 may pair the one or more recommendations with one or more purchasing incentives based upon, at least in part, the one or more fashion-ability scores representative of the one or more fashion products on the website.

For example, suppose user 46 has viewed a fashion product (e.g., fashion product 308) during a previous browsing session on the website (e.g., website 300). Suppose that user 46 navigates away from the website without purchasing the fashion product (e.g., fashion product 308). Subsequently, user 46 returns to the website (e.g., website 300). In response to user 46 accessing the website (e.g., website 300), cognitive fashion product recommendation process 10 may associate 200 one or more fashion products on the website with the user accessing the website (e.g., via cookie 64 on computing device and/or other sources). For example, cognitive fashion product recommendation process 10 may associate 200 the one or more fashion products (e.g., fashion product 308) with the user (e.g., by processing a browsing history associated with the user). In some embodiments and as discussed above, cognitive fashion product recommendation process 10 may generate the one or more fashion-ability scores for the one or more fashion products associated with the user and the one or more fashion products of the website. In this example, cognitive fashion product recommendation process 10 may determine that fashion product 308 is e.g., a luxury pair of socks, that has a positive price elasticity at a given time (e.g., determined by cognitive fashion product recommendation process 10 and/or user-specified). As such, cognitive fashion product recommendation process 10 may provide an increased price purchase incentive to motivate user 46 to purchase this exclusive pair of socks. For example, user 46 may have doubted the quality or brand of the fashion product based on a low price and may have left the website based on these doubts. In another example, cognitive fashion product recommendation process 10 may determine that fashion product 308 is e.g., a luxury pair of socks, that has a negative price elasticity at a given time (e.g., determined by cognitive fashion product recommendation process 10 and/or user-specified) for its fashion-ability score. As such, cognitive fashion product recommendation process 10 may pair a decreased price purchase incentive to the fashion product recommendation to motivate user 46 to purchase the luxury pair of socks (e.g., fashion product 308). For example, user 46 may have felt that the price for the fashion product was too high and may have left the website based on this price perception.

In some embodiments, cognitive fashion product recommendation process 10 may provide 202 the one or more recommendations to the user based upon, at least in part, one or more weights assigned to the one or more fashion products associated with the user and/or one or more weights assigned to the recommendations for one or more fashion products on the website. For example and as discussed above, cognitive fashion product recommendation process 10 may associate 200 one or more fashion products with a user on the website by determining which fashion products the user has viewed on the website, which fashion products the user has added to the shopping cart on the website, which fashion products the user has purchased on the website, etc. In some embodiments, cognitive fashion product recommendation process 10 may assign different weights based upon, at least in part, how the user is associated with the fashion product. For example and in some embodiments, a fashion product that is purchased may be a better indicator a user's fashion taste than a fashion product that is only viewed. In some embodiments, cognitive fashion product recommendation process 10 may assign a first weight to a fashion product the user has viewed. In some embodiments, cognitive fashion product recommendation process 10 may assign a second weight to a fashion product the user has placed in a wish list, where the second weight is greater than the first weight. In some embodiments, cognitive fashion product recommendation process 10 may assign a third weight to a fashion product the user has placed in a shopping cart (e.g., shopping cart 324), where the third weight is greater than the second weight. Additionally, cognitive fashion product recommendation process 10 may assign a fourth weight to a fashion product the user has purchased, where the fourth weight is greater than the third weight. While various weights have been described in the above example, it will be appreciated that various weights for different associations between the fashion product and a user are possible within the scope of the present disclosure. In some embodiments, the fashion-ability scores representative of fashion products with a higher weight (e.g., a threshold number of fashion products with the highest weights) may be used to provide the one or more recommendations for fashion products of the website.

In some embodiments, cognitive fashion product recommendation process 10 may assign different weights to the one or more recommendations based upon, at least in part, how the recommendation is generated. For example and as discussed above, cognitive fashion product recommendation process 10 may generate or provide recommendations to the user for fashion products on the website based upon, at least in part, one or more marketing objectives associated with cognitive fashion product recommendation process 10. A marketing objective as implemented by cognitive fashion product recommendation process 10 may define how various weights are assigned to the one or more recommendations for fashion products on the website. For example, suppose a marketing officer (e.g., user 52) of website 300 wants to emphasize e.g., customer engagement on a website as a marketing objective. This marketing objective may include the goal of increasing the number of users accessing the website with less emphasis on converting the user activity into immediate purchases. In this example, cognitive fashion product recommendation process 10 may assign a first weight to recommendations for fashion products that are similar (e.g., based upon, at least in part, the fashion-ability scores) to those fashion products that were viewed by the user on the website. Additionally, cognitive fashion product recommendation process 10 may assign a second weight to recommendations for fashion products that are similar (e.g., based upon, at least in part, the fashion-ability scores) to those fashion products that were added by the user to a wish list (e.g., wish list 328), where the second weight is greater than the first weight. For example and as discussed above, products placed in a wish list may be representative of products the user wants but chooses not to purchase immediately. By providing recommendations for fashion products that are similar (e.g., based upon, at least in part, the fashion-ability scores) to these wish-listed fashion products, more users may spend more time on the website. While the above example describes the marketing objective of customer engagement on the website, it will be appreciated that other marketing objectives and weights assigned to recommendations are possible within the scope of the present disclosure.

In some embodiments, cognitive fashion product recommendation process 10 may modify the weights assigned to the one or more fashion products associated with the user and/or one or more weights assigned to the recommendations for one or more fashion products on the website. For example, suppose a user (e.g., user 46) does not select the highest weighted or highest priority fashion product recommendation (e.g., fashion product recommendation 500). In some embodiments, cognitive fashion product recommendation process 10 may present the next highest priority or fashion product recommendation with the next highest weight (e.g., fashion product recommendation 502). Cognitive fashion product recommendation process 10 may repeat this process until all of the fashion recommendations are provided or until the user selects one of the recommended fashion products. In response, cognitive fashion product recommendation process 10 may modify the weights assigned to the one or more recommendations to prioritize the fashion product recommendation that was actually selected by the user and/or to modify to the sequence of recommendations based upon, at least in part, the fashion product recommendations actually selected by the user.

Figure 7:
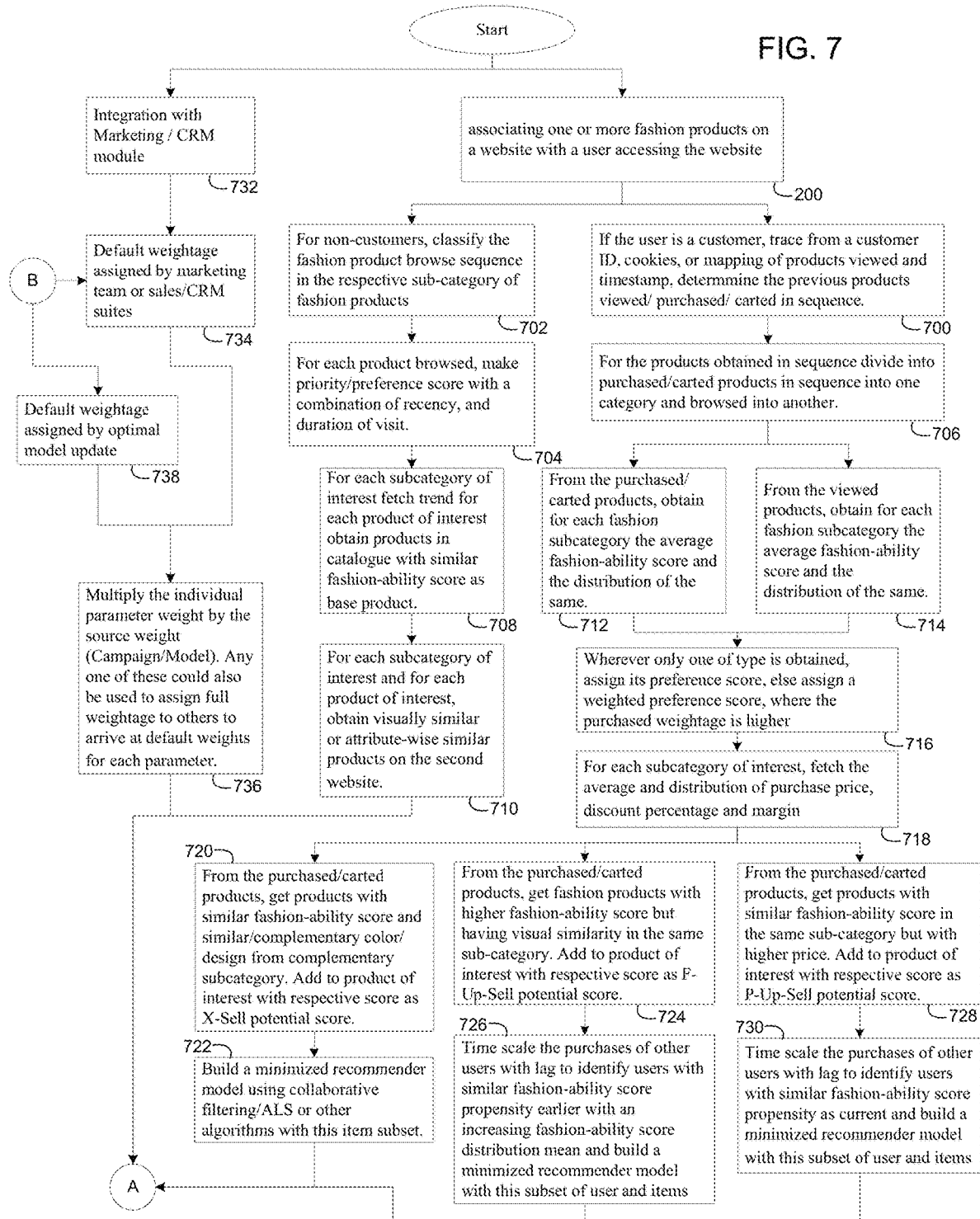
FIGS. 7 and 8 are example flowcharts of the cognitive fashion product recommendation process according to one or more example embodiments of the disclosure.
Figure 8:
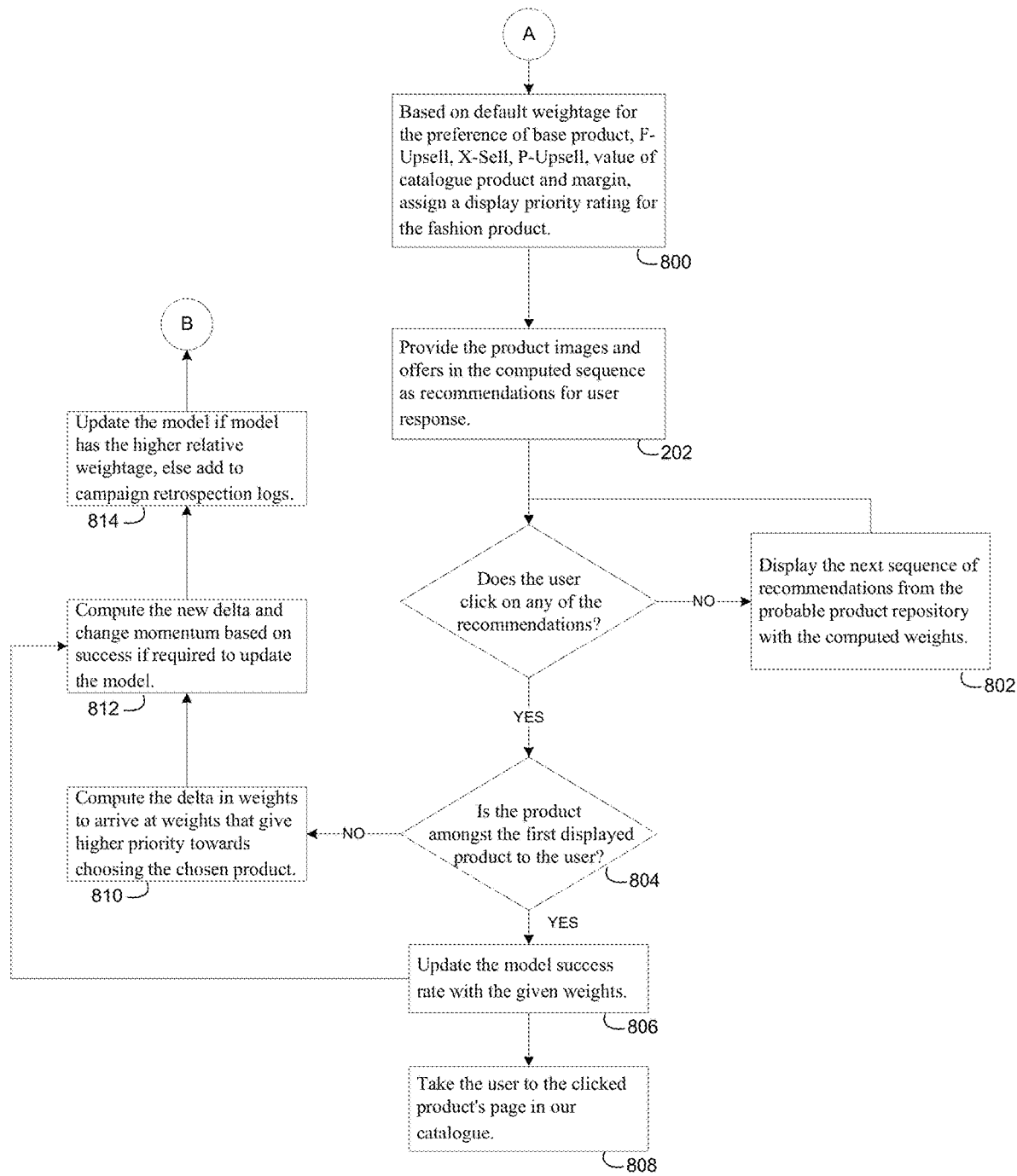

Referring also to FIGS. 7-8 and in some embodiments, associating 200 the one or more fashion products on a web site with the user may include determining 700 the previous fashion products viewed, fashion products purchased, and/or fashion products added to a shopping cart (e.g., carted) in sequence with a timestamp when cognitive fashion product recommendation process 10 determines that the user is a customer of the second website. In some embodiments where the user is not a customer (e.g., user is a non-customer), cognitive fashion product recommendation process 10 may classify 702 or define the fashion product browse sequence for each respective sub-category of fashion products. For example, cognitive fashion product recommendation process 10 may classify a browsing sequence for each sub-category of fashion (e.g., a browsing sequence associated with e.g., shirts browsed by the user and/or a browsing sequence associated with e.g., dresses browsed by the user). In some embodiments, cognitive fashion product recommendation process 10 may define 704 a priority or preference score for each fashion product browsed based upon, at least in part, how recently a user viewed the fashion product and the duration of the user's viewing of the fashion product. For example, fashion products viewed more recently may receive a higher priority or preference which fashion products that were viewed less recently may receive a lower priority or preference.

In some embodiments, cognitive fashion product recommendation process 10 may divide 706 the fashion product browsing sequence into a first group including fashion products added to the shopping cart and fashion products purchased and a second group including fashion products viewed by the customer. While two groups have been discussed, it will be appreciated that the fashion product browsing sequence may be divided into any number of groups within the scope of the present disclosure. As will be discussed in greater detail below and in some embodiments, the fashion browsing sequence may provide a ranking or priority by which cognitive fashion product recommendation process 10 provides recommendations for one or more fashion products on the website.

In some embodiments, suppose user 46 is not a previous customer of the website, cognitive fashion product recommendation process 10 may fetch 708 or otherwise obtain trend information for each fashion product of the fashion product browsing sequence and may obtain one or more fashion products from the website with similar fashion-ability scores as discussed above. In some embodiments, cognitive fashion product recommendation process 10 may obtain 710, for each fashion product category or sub-category of fashion products, visually similar fashion products from the second website and/or fashion products with similar attributes. For example, suppose a user views a particular pattern of dress but subsequently leaves the website without purchasing the dress. In some embodiments, cognitive fashion product recommendation process 10 may obtain visually similar dresses and/or similar dresses with the same particular pattern.

In another example, suppose user 46 is a previous customer, cognitive fashion product recommendation process 10 may obtain 712, for each fashion product category or sub-category of fashion products purchased by the user or added to the shopping cart by the user, the average fashion-ability score and/or the distribution of the fashion-ability score for the fashion products of that category or sub-category. In some embodiments, cognitive fashion product recommendation process 10 may obtain 714, for each fashion product category or sub-category of fashion products viewed by the user, the average fashion-ability score and/or the distribution of the fashion-ability score for the fashion products of that category or sub-category. In some embodiments, cognitive fashion product recommendation process 10 may assign 716 a weighted priority and/or preference score for purchased and carted fashion products than for viewed fashion products. In some embodiments, cognitive fashion product recommendation process 10 may obtain 718 the average purchase price, discount percentage, and/or margin for each fashion product category or sub-category represented by the fashion products associated 200 with the user.

In some embodiments, cognitive fashion product recommendation process 10 may identify 720 fashion products with similar fashion-ability scores, similar or complimentary colors, and/or similar or complimentary designs from a complementary category or sub-category of fashion products on the website based upon, at least in part, the one or more fashion products purchased and/or carted by the user. As discussed above, the one or more identified 720 fashion products may be fashion products to recommend as a cross sell. In some embodiments, the identified 720 fashion products may be added to a sequence of recommendations provided 202 to the user. In some embodiments and in response to identifying 720 fashion products with similar fashion-ability scores, similar or complimentary colors, and/or similar or complimentary designs from a complementary category or sub-category of fashion products, cognitive fashion product recommendation process 10 may build 722 a minimized recommender model (e.g., using collaborative filtering and/or algorithm) to determine one or more fashion products from the identified 720 fashion products to recommend to the user. In some embodiments, the minimized recommender model may determine one or more fashion products to add to a list of potential fashion products to recommend to the user. In some embodiments, the minimized recommender model may include a neural network. As will above and in some embodiments, these one or more fashion products determined by the minimized recommender model may be weighted based upon, at least in part, a cross sell weight or score.

In some embodiments, cognitive fashion product recommendation process 10 may identify 724 fashion products for recommending 202 to the user with higher fashion-ability scores from the same category or sub-category of fashion products on the second website based upon, at least in part, the one or more fashion products purchased and/or carted by the user. In some embodiments, the identified 724 fashion products may include one or more fashion products that are visually similar to the one or more fashion products purchased and/or carted by the user but with a higher fashion-ability score. As discussed above, these fashion products may be referred to as a fashion-ability up-sell and may be scored or weighted with a fashion-ability up-sell score. In some embodiments, the identified 724 fashion products may be added to a sequence of fashion products to recommend 202 to the user. In some embodiments, cognitive fashion product recommendation process 10 may time scale the purchases of other users with lag to identify users with similar fashion-ability score propensity earlier with an increasing fashion-ability score distribution mean and build 726 a minimized recommender model with this subset of users and fashion products. In some embodiments, the minimized recommender model may include a neural network.

In some embodiments and as discussed above, cognitive fashion product recommendation process 10 may identify 728 fashion products with similar fashion-ability scores from the same category or sub-category of fashion products on the second web site but with a higher price based upon, at least in part, the one or more fashion products purchased and/or carted by the user. As discussed above, these fashion products may be referred to as an up-sell and may be scored or weighted with an up-sell score. In some embodiments, the identified 728 fashion products may be added to a sequence of fashion products to recommend 202 to the user. In some embodiments, cognitive fashion product recommendation process 10 may time scale the purchases of other users with lag to identify users with similar fashion-ability score propensity as the current user and may build 730 a minimized recommender model with this subset of users and fashion products.

In some embodiments and as will be discussed in greater detail below, the display priority weight for the one or more digital advertisements may be defined based upon, at least in part, integration 732 with a marketing system and/or Customer Relationship Management (e.g. CRM) module (e.g., in communication with cognitive fashion product recommendation process 10). For example and in some embodiments, the display priority weight for the one or more digital advertisements may be assigned based upon, at least in part, a weighting metric assigned 734 by a marketing team (e.g., user-defined) and/or by sales/CRM systems (e.g., algorithmically-defined). In some embodiments, individual parameter weights may be multiplied 736 by weights from e.g., a marketing team 734 and/or a neural network model 738).

Referring also to FIG. 8 and as discussed above, cognitive fashion product recommendation process 10 may generate a prioritized sequence of recommendations for providing 202 to the user. For example, cognitive fashion product recommendation process 10 may assign 800 a display priority rating or weight for each fashion product (e.g., a weight for fashion products with similar fashion-ability scores, a weight for fashion products with higher fashion-ability scores, a weight for fashion products with similar fashion-ability scores with a higher price, a weight for fashion products that are visually similar to fashion products associated with the user, etc.). In some embodiments and as discussed above, the prioritized sequence of fashion products to recommend to the user may be defined by a neural network model.

In some embodiments, cognitive fashion product recommendation process 10 may modify the weights assigned to the digital advertisements of the one or more fashion products on the second website. For example, suppose a user (e.g., user 46) does not select the highest weighted or highest priority fashion product recommendation. In some embodiments, cognitive fashion product recommendation process 10 may provide 802 the next highest priority or fashion product recommendation with the next highest weight. Cognitive fashion product recommendation process 10 may repeat this process until all of a pre-defined number of fashion product recommendations are provided or until the user selects one of the fashion product recommendations (808).

In some embodiments and in response to the user selecting a fashion product recommendation, cognitive fashion product recommendation process 10 may determine 804 whether the recommendation was among the first or highest priority fashion product recommendations. In some embodiments, at 806 cognitive fashion product recommendation process 10 may modify the weights assigned to the one or more fashion product recommendations to prioritize the fashion product recommendation that was actually selected by the user and/or to modify to the sequence of fashion product recommendations based upon, at least in part, the fashion product recommendations actually selected by the user. For example, cognitive fashion product recommendation process 10 may compute 810 the delta in weights to arrive at weights that give the higher priority towards the actually selected fashion product recommendation. In some embodiments, cognitive fashion product recommendation process 10 may compute 812 a new delta and/or change momentum and may update 814 the neural network model if the neural network model has the higher relative weighting. Otherwise, cognitive fashion product recommendation process 10 may add the modified weights to a campaign retrospection log.

Figure 9:
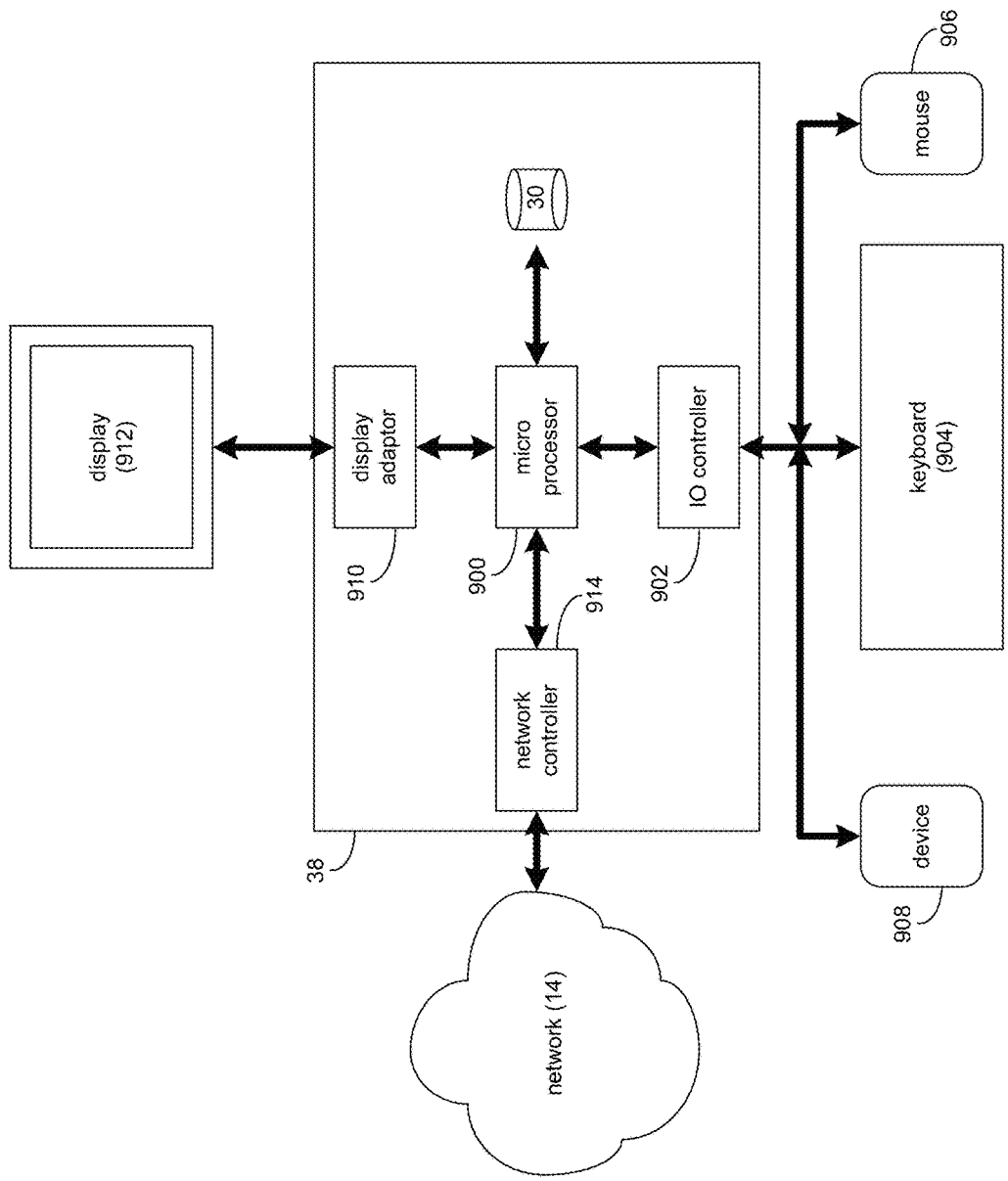
FIG. 9 is an example diagrammatic view of a client electronic device of FIG. 1 according to one or more example embodiments of the disclosure.

Referring also to FIG. 9, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, cognitive fashion product recommendation process 10 may be substituted for client electronic device 38 within FIG. 9, examples of which may include but are not limited to computing device 12 and/or client electronic devices 40, 42, 44.

Client electronic device 38 may include a processor and/or microprocessor (e.g., microprocessor 900) configured to, e.g., process data and execute the above-noted code/instruction sets and subroutines. Microprocessor 900 may be coupled via a storage adaptor (not shown) to the above-noted storage device(s) (e.g., storage device 30). An I/O controller (e.g., I/O controller 902) may be configured to couple microprocessor 200 with various devices, such as keyboard 904, pointing/selecting device (e.g., mouse 906), custom device (e.g., device 908), USB ports (not shown), and printer ports (not shown). A display adaptor (e.g., display adaptor 910) may be configured to couple display 912 (e.g., CRT or LCD monitor(s)) with microprocessor 900, while network controller/adaptor 914 (e.g., an Ethernet adaptor) may be configured to couple microprocessor 900 to the above-noted network 14 (e.g., the Internet or a local area network).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, executed on a computing device, comprising:

training, according to a process, a plurality of neural networks from a plurality of images, wherein each neural network corresponds to an attribute of the plurality of images, a category of the plurality of images, or a sub-category of the plurality of images, wherein the process is selected and identified to process one or more images of a fashion category and/or a fashion sub-category to generate one or more fashion-ability scores each comprising a numerical representation of a corresponding fashion product defined in a corresponding image of the corresponding fashion product;

for each trained neural network, scoring each of the plurality of images against each attribute that the neural network is trained for, and generating one or more scored vectors wherein each scored vector corresponds to a particular attribute used to train the neural network;

joining each of the scored vectors for each of the plurality of images to form a multi-dimensional vector corresponding to a visual representation of each of the plurality of images;

associating, at the computing device, one or more fashion products on a website with a user accessing the website, wherein each of the one or more fashion products associated with the user on the website is assigned a priority score based upon, at least in part a fashion browsing sequence of the user;

generating the one or more fashion-ability scores such that the one or more fashion-ability scores are representative of the one or more fashion products on the website, by selecting an attribute and retrieving the scored vector that is trained for the selected attribute;

in response to retrieving the scored vector trained for the selected attribute, producing the one or more fashion-ability scores that represents one or more fashion products corresponding to the selected attribute; and providing one or more recommendations to the user for the one or more fashion products on the website based upon, at least in part, one or more fashion-ability scores representative of the one or more fashion products associated with the user on the website and the one or more fashion-ability scores representative of the one or more fashion products on the website, wherein the one or more recommendations are presented to the user in order of the priority score assigned to the one or more fashion products on the website.

2. The computer-implemented method of claim 1, wherein providing the one or more recommendations to the user for the one or more fashion products on the website includes:
providing one or more recommendations for one or more newly added fashion products based upon, at least in part, the one or more fashion-ability scores representative of the one or more fashion products associated with the user on the website and one or more fashion-ability scores representative of the one or more newly added fashion products.

3. The computer-implemented method of claim 1, wherein providing the one or more recommendations to the user for the one or more fashion products on the website includes:
providing the one or more recommendations for the one or more fashion products on the website with a fashion-ability score within a threshold of the fashion-ability score of the one or more fashion products associated with the user.

4. The computer-implemented method of claim 3, wherein providing the one or more recommendations to the user for the one or more fashion products on the website includes:
providing the one or more recommendations for one or more fashion products on the website from a different fashion category than a fashion category of the one or more fashion products associated with the user.

5. The computer-implemented method of claim 1, wherein providing the one or more recommendations to the user for the one or more fashion products on the website includes:
providing the one or more recommendations for the one or more fashion products on the website with a fashion-ability score greater than the fashion-ability score of the one or more fashion products associated with the user.

6. The computer-implemented method of claim 1, wherein providing the one or more recommendations to the user for the one or more fashion products on the website includes:
providing the one or more recommendations for the one or more fashion products on the website from the same fashion category as the fashion products associated with the user that have fashion-ability scores within a threshold of the fashion-ability score of the one or more fashion products associated with the user and that have a price greater than a price of the one or more fashion products associated with the user.

7. The computer-implemented method of claim 1, further comprising:
determining that the user is accessing the website in response to a user selection of a digital advertisement displayed on a different website;
determining one or more fashion products shown in the digital advertisement displayed on the different web site; and
providing the one or more recommendations for the one or more fashion products on the website based upon, at least in part, one or more fashion-ability scores representative of the one or more fashion products shown in the digital advertisement displayed on the different web site and the one or more fashion-ability scores representative of the one or more fashion products on the website.

8. A computer program product comprising a non-transitory computer readable storage medium having a plurality of instructions stored thereon, which, when executed by a processor, cause the processor to perform operations comprising:
training, according to a process, a plurality of neural networks from a plurality of images, wherein each neural network corresponds to an attribute of the plurality of images, a category of the plurality of images, or a sub-category of the plurality of images, wherein the process is selected and identified to process one or more images of a fashion category and/or a fashion sub-category to generate one or more fashion-ability scores each comprising a numerical representation of a corresponding fashion product defined in a corresponding image of the corresponding fashion product;
for each trained neural network, scoring each of the plurality of images against each attribute that the neural network is trained for, and generating one or more scored vectors wherein each scored vector corresponds to a particular attribute used to train the neural network;
joining each of the scored vectors for each of the plurality of images to form a multi-dimensional vector corresponding to a visual representation of each of the plurality of images;
associating, at the computing device, one or more fashion products on a website with a user accessing the website, wherein each of the one or more fashion products associated with the user on the website is assigned a priority score based upon, at least in part a fashion browsing sequence of the user;
generating the one or more fashion-ability scores such that the one or more fashion-ability scores are representative of the one or more fashion products on the website, by selecting an attribute and retrieving the scored vector that is trained for the selected attribute;
in response to retrieving the scored vector trained for the selected attribute, producing the one or more fashion-ability scores that represents one or more fashion products corresponding to the selected attribute; and
providing one or more recommendations to the user for the one or more fashion products on the website based upon, at least in part, one or more fashion-ability scores representative of the one or more fashion products associated with the user on the website and the one or more fashion-ability scores representative of the one or more fashion products on the website, wherein the one or more recommendations are presented to the user in order of the priority score assigned to the one or more fashion products on the website.

9. The computer program product of claim 8, wherein providing the one or more recommendations to the user for the one or more fashion products on the website includes:
providing one or more recommendations for one or more newly added fashion products based upon, at least in part, the one or more fashion-ability scores representative of the one or more fashion products associated with the user on the website and one or more fashion-ability scores representative of the one or more newly added fashion products.

10. The computer program product of claim 8, wherein providing the one or more recommendations to the user for the one or more fashion products on the website includes:

providing the one or more recommendations for the one or more fashion products on the website with a fashion-ability score within a threshold of the fashion-ability score of the one or more fashion products associated with the user.

11. The computer program product of claim 10, wherein providing the one or more recommendations to the user for the one or more fashion products on the website includes:
providing the one or more recommendations for one or more fashion products on the website from a different fashion category than a fashion category of the one or more fashion products associated with the user.

12. The computer program product of claim 8, wherein providing the one or more recommendations to the user for the one or more fashion products on the website includes:
providing the one or more recommendations for the one or more fashion products on the website with a fashion-ability score greater than the fashion-ability score of the one or more fashion products associated with the user.

13. The computer program product of claim 8, wherein providing the one or more recommendations to the user for the one or more fashion products on the website includes:
providing the one or more recommendations for the one or more fashion products on the website from the same fashion category as the fashion products associated with the user that have fashion-ability scores within a threshold of the fashion-ability score of the one or more fashion products associated with the user and that have a price greater than a price of the one or more fashion products associated with the user.

14. The computer program product of claim 8, further comprising:
determining that the user is accessing the website in response to a user selection of a digital advertisement displayed on a different website;
determining one or more fashion products shown in the digital advertisement displayed on the different web site; and
providing the one or more recommendations for the one or more fashion products on the website based upon, at least in part, one or more fashion-ability scores representative of the one or more fashion products shown in the digital advertisement displayed on the different website and the one or more fashion-ability scores representative of the one or more fashion products on the website.

15. A computing system including one or more processors and one or more memories configured to perform operations comprising:
training, according to a process, a plurality of neural networks from a plurality of images, wherein each neural network corresponds to an attribute of the plurality of images, a category of the plurality of images, or a sub-category of the plurality of images, wherein the process is selected and identified to process one or more images of a fashion category and/or a fashion sub-category to generate one or more fashion-ability scores each comprising a numerical representation of a corresponding fashion product defined in a corresponding image of the corresponding fashion product;
for each trained neural network, scoring each of the plurality of images against each attribute that the neural network is trained for, and generating one or more scored vectors wherein each scored vector corresponds to a particular attribute used to train the neural network;
joining each of the scored vectors for each of the plurality of images to form a multi-dimensional vector corresponding to a visual representation of each of the plurality of images;
associating, at the computing device, one or more fashion products on a website with a user accessing the website, wherein each of the one or more fashion products associated with the user on the website is assigned a priority score based upon, at least in part a fashion browsing sequence of the user;
generating the one or more fashion-ability scores such that the one or more fashion-ability scores are representative of the one or more fashion products on the website, by selecting an attribute and retrieving the scored vector that is trained for the selected attribute;
in response to retrieving the scored vector trained for the selected attribute, producing the one or more fashion-ability scores that represents one or more fashion products corresponding to the selected attribute; and
providing one or more recommendations to the user for the one or more fashion products on the website based upon, at least in part, one or more fashion-ability scores representative of the one or more fashion products associated with the user on the website and the one or more fashion-ability scores representative of the one or more fashion products on the website, wherein the one or more recommendations are presented to the user in order of the priority score assigned to the one or more fashion products on the website.

16. The computing system of claim 15, wherein providing the one or more recommendations to the user for the one or more fashion products on the website includes:
providing one or more recommendations for one or more newly added fashion products based upon, at least in part, the one or more fashion-ability scores representative of the one or more fashion products associated with the user on the website and one or more fashion-ability scores representative of the one or more newly added fashion products.

17. The computing system of claim 15, wherein providing the one or more recommendations to the user for the one or more fashion products on the web site includes:
providing the one or more recommendations for the one or more fashion products on the website with a fashion-ability score within a threshold of the fashion-ability score of the one or more fashion products associated with the user.

18. The computing system of claim 17, wherein providing the one or more recommendations to the user for the one or more fashion products on the website includes:
providing the one or more recommendations for one or more fashion products on the website from a different fashion category than a fashion category of the one or more fashion products associated with the user.

19. The computing system of claim 15, wherein providing the one or more recommendations to the user for the one or more fashion products on the website includes:
providing the one or more recommendations for the one or more fashion products on the website with a fashion-ability score greater than the fashion-ability score of the one or more fashion products associated with the user.

20. The computing system of claim 15, wherein providing the one or more recommendations to the user for the one or more fashion products on the website includes:
providing the one or more recommendations for the one or more fashion products on the website from the same fashion category as the fashion products associated with the user that have fashion-ability scores within a threshold of the fashion-ability score of the one or more fashion products associated with the user and that have a price greater than a price of the one or more fashion products associated with the user.

* * * * *